United States Patent
Muhsin et al.

(10) Patent No.: US 12,495,967 B2
(45) Date of Patent: Dec. 16, 2025

(54) MODULAR WIRELESS PHYSIOLOGICAL PARAMETER SYSTEM

(71) Applicant: MASIMO CORPORATION, Irvine, CA (US)

(72) Inventors: Bilal Muhsin, San Clemente, CA (US); Nicholas Evan Barker, Laguna Beach, CA (US); Ammar Al-Ali, San Juan Capistrano, CA (US)

(73) Assignee: MASIMO CORPORATION, Irvine, CA (US)

( * ) Notice: Subject to any disclaimer, the term of this patent is extended or adjusted under 35 U.S.C. 154(b) by 0 days.

(21) Appl. No.: 18/123,131

(22) Filed: Mar. 17, 2023

(65) Prior Publication Data

US 2023/0329554 A1 Oct. 19, 2023

Related U.S. Application Data

(63) Continuation of application No. 16/717,882, filed on Dec. 17, 2019, now abandoned.
(Continued)

(51) Int. Cl.
*A61B 5/00* (2006.01)
*A61B 5/0205* (2006.01)
(Continued)

(52) U.S. Cl.
CPC .......... *A61B 5/002* (2013.01); *A61B 5/02055* (2013.01); *A61B 5/7405* (2013.01); *A61B 5/742* (2013.01); *A61B 5/746* (2013.01); *H02J 7/00032* (2020.01); *H02J 7/02* (2013.01); *A61B 5/021* (2013.01); *A61B 5/024* (2013.01);
(Continued)

(58) Field of Classification Search
CPC ... A61B 5/002; A61B 5/02055; A61B 5/7405; A61B 5/742; A61B 5/746; A61B 5/021; A61B 5/024; A61B 5/0816; A61B 5/14542; A61B 5/0024; A61B 2560/045; A61B 2560/0456; A61B 2560/0214; A61B 2562/227; H02J 7/00032; H02J 7/02; H02J 7/00034; H02J 2310/23; H02J 50/10
See application file for complete search history.

(56) References Cited

U.S. PATENT DOCUMENTS 4,960,128 A 10/1990 Gordon et al.
4,964,408 A 10/1990 Hink et al.
(Continued)

OTHER PUBLICATIONS

US 2022/0192529 A1, 06/2022, Al-Ali et al. (withdrawn)
US 2024/0016391 A1, 01/2024, Lapotko et al. (withdrawn)

*Primary Examiner* — Rex R Holmes
*Assistant Examiner* — Shreya Anjaria
(74) *Attorney, Agent, or Firm* — KNOBBE, MARTENS, OLSON, & BEAR, LLP

(57) ABSTRACT

A sensor system for monitoring patients is provided. The sensor system includes a wireless charging dock, one or more patient sensors, and a processing module. The patient sensor is configured to collect patient physiological data and send the data to the processing module. The processing module wirelessly transmits the patient physiological data to a patient monitor system. The wireless charging dock is wirelessly and removably coupled to the processing module to wirelessly provide power for the processing module. The wireless charging dock is magnetically coupled to the processing module.

15 Claims, 23 Drawing Sheets

Related U.S. Application Data

(60) Provisional application No. 62/808,708, filed on Feb. 21, 2019, provisional application No. 62/781,527, filed on Dec. 18, 2018.

(51) Int. Cl.

| | |
|---|---|
| *A61B 5/021* | (2006.01) |
| *A61B 5/024* | (2006.01) |
| *A61B 5/08* | (2006.01) |
| *A61B 5/145* | (2006.01) |
| *H02J 7/00* | (2006.01) |
| *H02J 7/02* | (2016.01) |

(52) U.S. Cl.
CPC ......... *A61B 5/0816* (2013.01); *A61B 5/14542* (2013.01); *A61B 2560/045* (2013.01); *A61B 2560/0456* (2013.01)

(56) References Cited

U.S. PATENT DOCUMENTS

| | | |
|---|---|---|
| 5,319,355 A | 6/1994 | Russek |
| 5,337,744 A | 8/1994 | Branigan |
| 5,341,805 A | 8/1994 | Stavridi et al. |
| D353,195 S | 12/1994 | Savage et al. |
| D353,196 S | 12/1994 | Savage et al. |
| 5,377,676 A | 1/1995 | Vari et al. |
| D359,546 S | 6/1995 | Savage et al. |
| 5,431,170 A | 7/1995 | Mathews |
| 5,436,499 A | 7/1995 | Namavar et al. |
| D361,840 S | 8/1995 | Savage et al. |
| D362,063 S | 9/1995 | Savage et al. |
| D363,120 S | 10/1995 | Savage et al. |
| 5,456,252 A | 10/1995 | Vari et al. |
| 5,479,934 A | 1/1996 | Imran |
| 5,482,036 A | 1/1996 | Diab et al. |
| 5,494,043 A | 2/1996 | O'Sullivan et al. |
| 5,533,511 A | 7/1996 | Kaspari et al. |
| 5,561,275 A | 10/1996 | Savage et al. |
| 5,590,649 A | 1/1997 | Caro et al. |
| 5,602,924 A | 2/1997 | Durand et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,890,929 A | 4/1999 | Mills et al. |
| 5,919,134 A | 7/1999 | Diab |
| 5,987,343 A | 11/1999 | Kinast |
| 5,995,855 A | 11/1999 | Kiani et al. |
| 5,997,343 A | 12/1999 | Mills et al. |
| 6,002,952 A | 12/1999 | Diab et al. |
| 6,010,937 A | 1/2000 | Karam et al. |
| 6,027,452 A | 2/2000 | Flaherty et al. |
| 6,040,578 A | 3/2000 | Malin et al. |
| 6,066,204 A | 5/2000 | Haven |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,152,754 A | 11/2000 | Gerhardt et al. |
| 6,184,521 B1 | 2/2001 | Coffin, IV et al. |
| 6,232,609 B1 | 5/2001 | Snyder et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,280,381 B1 | 8/2001 | Malin et al. |
| 6,285,896 B1 | 9/2001 | Tobler et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,334,065 B1 | 12/2001 | Al-Ali et al. |
| 6,360,114 B1 | 3/2002 | Diab et al. |
| 6,368,283 B1 | 4/2002 | Xu et al. |
| 6,377,829 B1 | 4/2002 | Al-Ali |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,505,059 B1 | 1/2003 | Kollias et al. |
| 6,525,386 B1 | 2/2003 | Mills et al. |
| 6,526,300 B1 | 2/2003 | Kiani et al. |
| 6,534,012 B1 | 3/2003 | Hazen et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |
| 6,587,199 B1 | 7/2003 | Luu |
| 6,595,316 B2 | 7/2003 | Cybulski et al. |
| 6,597,932 B2 | 7/2003 | Tian et al. |
| 6,606,511 B1 | 8/2003 | Ali et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,658,276 B2 | 12/2003 | Kiani et al. |
| 6,661,161 B1 | 12/2003 | Lanzo et al. |
| 6,697,656 B1 | 2/2004 | Al-Ali |
| 6,697,658 B2 | 2/2004 | Al-Ali |
| RE38,476 E | 3/2004 | Diab et al. |
| RE38,492 E | 4/2004 | Diab et al. |
| 6,738,652 B2 | 5/2004 | Mattu et al. |
| 6,760,607 B2 | 7/2004 | Al-Ali |
| 6,788,965 B2 | 9/2004 | Ruchti et al. |
| 6,816,241 B2 | 11/2004 | Grubisic |
| 6,822,564 B2 | 11/2004 | Al-Ali |
| 6,850,787 B2 | 2/2005 | Weber et al. |
| 6,850,788 B2 | 2/2005 | Al-Ali |
| 6,876,931 B2 | 4/2005 | Lorenz et al. |
| 6,920,345 B2 | 7/2005 | Al-Ali et al. |
| 6,934,570 B2 | 8/2005 | Kiani et al. |
| 6,943,348 B1 | 9/2005 | Coffin, IV |
| 6,956,649 B2 | 10/2005 | Acosta et al. |
| 6,961,598 B2 | 11/2005 | Diab |
| 6,970,792 B1 | 11/2005 | Diab |
| 6,985,764 B2 | 1/2006 | Mason et al. |
| 6,990,364 B2 | 1/2006 | Ruchti et al. |
| 6,998,247 B2 | 2/2006 | Monfre et al. |
| 7,003,338 B2 | 2/2006 | Weber et al. |
| 7,015,451 B2 | 3/2006 | Dalke et al. |
| 7,027,849 B2 | 4/2006 | Al-Ali |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,133,710 B2 | 11/2006 | Acosta et al. |
| 7,142,901 B2 | 11/2006 | Kiani et al. |
| 7,225,006 B2 | 5/2007 | Al-Ali et al. |
| RE39,672 E | 6/2007 | Shehada et al. |
| 7,254,429 B2 | 8/2007 | Schurman et al. |
| 7,254,431 B2 | 8/2007 | Al-Ali et al. |
| 7,254,434 B2 | 8/2007 | Schulz et al. |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,377,794 B2 | 5/2008 | Al-Ali et al. |

(56) References Cited

U.S. PATENT DOCUMENTS

| | | |
|---|---|---|
| 7,395,158 B2 | 7/2008 | Monfre et al. |
| 7,415,297 B2 | 8/2008 | Al-Ali et al. |
| 7,438,683 B2 | 10/2008 | Al-Ali et al. |
| 7,483,729 B2 | 1/2009 | Al-Ali et al. |
| D587,657 S | 3/2009 | Al-Ali et al. |
| 7,500,950 B2 | 3/2009 | Al-Ali et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| D592,507 S | 5/2009 | Wachman et al. |
| 7,530,942 B1 | 5/2009 | Diab |
| 7,593,230 B2 | 9/2009 | Abul-Haj et al. |
| 7,596,398 B2 | 9/2009 | Al-Ali et al. |
| 7,606,608 B2 | 10/2009 | Blank et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,761,127 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| RE41,912 E | 11/2010 | Parker |
| 7,880,626 B2 | 2/2011 | Al-Ali et al. |
| 7,909,772 B2 | 3/2011 | Popov et al. |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,941,199 B2 | 5/2011 | Kiani |
| 7,957,780 B2 | 6/2011 | Lamego et al. |
| 7,962,188 B2 | 6/2011 | Kiani et al. |
| 7,976,472 B2 | 7/2011 | Kiani |
| 7,990,382 B2 | 8/2011 | Kiani |
| 8,008,088 B2 | 8/2011 | Bellott et al. |
| RE42,753 E | 9/2011 | Kiani-Azarbayjany et al. |
| 8,028,701 B2 | 10/2011 | Al-Ali et al. |
| 8,029,765 B2 | 10/2011 | Bellott et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,130,105 B2 | 3/2012 | Al-Ali et al. |
| 8,182,443 B1 | 5/2012 | Kiani |
| 8,190,223 B2 | 5/2012 | Al-Ali et al. |
| 8,203,438 B2 | 6/2012 | Kiani et al. |
| 8,203,704 B2 | 6/2012 | Merritt et al. |
| 8,219,172 B2 | 7/2012 | Schurman et al. |
| 8,224,411 B2 | 7/2012 | Al-Ali et al. |
| 8,229,532 B2 | 7/2012 | Davis |
| 8,233,955 B2 | 7/2012 | Al-Ali et al. |
| 8,255,026 B1 | 8/2012 | Al-Ali |
| 8,265,723 B1 | 9/2012 | McHale et al. |
| 8,274,360 B2 | 9/2012 | Sampath et al. |
| 8,280,473 B2 | 10/2012 | Al-Ali |
| 8,315,683 B2 | 11/2012 | Al-Ali et al. |
| RE43,860 E | 12/2012 | Parker |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,374,665 B2 | 2/2013 | Lamego |
| 8,388,353 B2 | 3/2013 | Kiani et al. |
| 8,401,602 B2 | 3/2013 | Kiani |
| 8,414,499 B2 | 4/2013 | Al-Ali et al. |
| 8,418,524 B2 | 4/2013 | Al-Ali |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,707 B2 | 6/2013 | Kiani |
| 8,471,713 B2 | 6/2013 | Poeze et al. |
| 8,473,020 B2 | 6/2013 | Kiani et al. |
| 8,509,867 B2 | 8/2013 | Workman et al. |
| 8,515,509 B2 | 8/2013 | Bruinsma et al. |
| 8,523,781 B2 | 9/2013 | Ai-Ai |
| D692,145 S | 10/2013 | Al-Ali et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,584,345 B2 | 11/2013 | Al-Ali et al. |
| 8,588,880 B2 | 11/2013 | Abdul-Hafiz et al. |
| 8,630,691 B2 | 1/2014 | Lamego et al. |
| 8,641,631 B2 | 2/2014 | Sierra et al. |
| 8,652,060 B2 | 2/2014 | Al-Ali |
| 8,666,468 B1 | 3/2014 | Al-Ali |
| 8,670,811 B2 | 3/2014 | O'Reilly |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,702,627 B2 | 4/2014 | Telfort et al. |
| 8,712,494 B1 | 4/2014 | MacNeish, III et al. |
| 8,715,206 B2 | 5/2014 | Telfort et al. |
| 8,723,677 B1 | 5/2014 | Kiani |
| 8,740,792 B1 | 6/2014 | Kiani et al. |
| 8,755,535 B2 | 6/2014 | Telfort et al. |
| 8,755,872 B1 | 6/2014 | Marinow |
| 8,764,671 B2 | 7/2014 | Kiani |
| 8,768,423 B2 | 7/2014 | Shakespeare et al. |
| 8,771,204 B2 | 7/2014 | Telfort et al. |
| 8,781,544 B2 | 7/2014 | Al-Ali et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,840,549 B2 | 9/2014 | Al-Ali et al. |
| 8,852,094 B2 | 10/2014 | Al-Ali et al. |
| 8,852,994 B2 | 10/2014 | Wojtczuk et al. |
| 8,897,847 B2 | 11/2014 | Al-Ali |
| 8,911,377 B2 | 12/2014 | Al-Ali |
| 8,989,831 B2 | 3/2015 | Al-Ali et al. |
| 8,998,809 B2 | 4/2015 | Kiani |
| 9,066,666 B2 | 6/2015 | Kiani |
| 9,066,680 B1 | 6/2015 | Al-Ali et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,131,881 B2 | 9/2015 | Diab et al. |
| 9,138,180 B1 | 9/2015 | Coverston et al. |
| 9,153,112 B1 | 10/2015 | Kiani et al. |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,095 B1 | 12/2015 | Al-Ali |
| 9,218,454 B2 * | 12/2015 | Kiani .................. G06F 3/0482 |
| 9,245,668 B1 | 1/2016 | Vo et al. |
| 9,267,572 B2 | 2/2016 | Barker et al. |
| 9,277,880 B2 | 3/2016 | Poeze et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,392,945 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,474,474 B2 | 10/2016 | Lamego et al. |
| 9,480,435 B2 * | 11/2016 | Olsen .................. A61B 5/7405 |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,560,996 B2 | 2/2017 | Kiani |
| 9,579,039 B2 | 2/2017 | Jansen et al. |
| 9,622,692 B2 | 4/2017 | Lamego et al. |

(56) References Cited

U.S. PATENT DOCUMENTS

| | | |
|---|---|---|
| D788,312 S | 5/2017 | Al-Ali et al. |
| 9,649,054 B2 | 5/2017 | Lamego et al. |
| 9,697,928 B2 | 7/2017 | Al-Ali et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,749,232 B2 | 8/2017 | Sampath et al. |
| 9,750,442 B2 | 9/2017 | Olsen |
| 9,750,461 B1 | 9/2017 | Telfort |
| 9,775,545 B2 | 10/2017 | Al-Ali et al. |
| 9,778,079 B1 | 10/2017 | Al-Ali et al. |
| 9,782,077 B2 | 10/2017 | Lamego et al. |
| 9,787,568 B2 | 10/2017 | Lamego et al. |
| 9,808,188 B1 | 11/2017 | Perea et al. |
| 9,839,379 B2 | 12/2017 | Al-Ali et al. |
| 9,839,381 B1 | 12/2017 | Weber et al. |
| 9,847,749 B2 | 12/2017 | Kiani et al. |
| 9,848,800 B1 | 12/2017 | Lee et al. |
| 9,861,298 B2 | 1/2018 | Eckerbom et al. |
| 9,861,305 B1 | 1/2018 | Weber et al. |
| 9,877,650 B2 | 1/2018 | Muhsin et al. |
| 9,891,079 B2 | 2/2018 | Dalvi |
| 9,924,897 B1 | 3/2018 | Abdul-Hafiz |
| 9,936,917 B2 | 4/2018 | Poeze et al. |
| 9,955,937 B2 | 5/2018 | Telfort |
| 9,965,946 B2 | 5/2018 | Al-Ali et al. |
| D820,865 S | 6/2018 | Muhsin et al. |
| 9,986,952 B2 | 6/2018 | Dalvi et al. |
| D822,215 S | 7/2018 | Al-Ali et al. |
| D822,216 S | 7/2018 | Barker et al. |
| 10,010,276 B2 | 7/2018 | Al-Ali et al. |
| 10,086,138 B1 | 10/2018 | Novak, Jr. |
| 10,111,591 B2 | 10/2018 | Dyell et al. |
| D833,624 S | 11/2018 | DeJong et al. |
| 10,123,729 B2 | 11/2018 | Dyell et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,205,291 B2 | 2/2019 | Scruggs et al. |
| 10,226,187 B2 | 3/2019 | Al-Ali et al. |
| 10,231,657 B2 | 3/2019 | Al-Ali et al. |
| 10,231,670 B2 | 3/2019 | Blank et al. |
| RE47,353 E | 4/2019 | Kiani et al. |
| 10,279,247 B2 | 5/2019 | Kiani |
| 10,292,664 B2 | 5/2019 | Al-Ali |
| 10,299,720 B2 | 5/2019 | Brown et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| RE47,882 E | 3/2020 | Al-Ali |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |

(56) References Cited

U.S. PATENT DOCUMENTS

| | | |
|---|---|---|
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,036,293 S | 7/2024 | Al-All et al. |
| D1,037,462 S | 7/2024 | Al-All et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Klani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| D1,060,680 S | 2/2025 | Al-Ali et al. |
| D1,061,585 S | 2/2025 | Indorf |
| D1,063,893 S | 2/2025 | DeJong et al. |
| 12,220,207 B2 | 2/2025 | Telfort et al. |
| 12,235,941 B2 | 2/2025 | Kiani et al. |
| 12,236,767 B2 | 2/2025 | Muhsin |
| D1,066,244 S | 3/2025 | Lim et al. |
| D1,066,672 S | 3/2025 | Al-Ali et al. |
| D1,072,837 S | 4/2025 | Ahmed et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0189871 A1 | 8/2006 | Al-Ali et al. |
| 2007/0073116 A1 | 3/2007 | Kiani et al. |
| 2007/0180140 A1* | 8/2007 | Welch ................. G08B 21/0453 600/300 |
| 2007/0244377 A1 | 10/2007 | Cozad et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1* | 9/2008 | Al-Ali ................. A61B 5/02416 600/324 |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275813 A1 | 11/2009 | Davis |
| 2009/0275844 A1 | 11/2009 | Al-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0191069 A1* | 7/2010 | Fisher .................... G01R 33/28 600/300 |
| 2010/0234718 A1 | 9/2010 | Sampath et al. |
| 2010/0261979 A1* | 10/2010 | Kiani .................... G16H 40/63 600/301 |
| 2010/0270257 A1 | 10/2010 | Wachman et al. |
| 2011/0028806 A1 | 2/2011 | Merritt et al. |
| 2011/0028809 A1* | 2/2011 | Goodman ........... A61B 5/02438 600/476 |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0137297 A1 | 6/2011 | Kiani et al. |
| 2011/0172498 A1 | 7/2011 | Olsen et al. |
| 2011/0230733 A1 | 9/2011 | Al-Ali |
| 2012/0123231 A1 | 5/2012 | O'Reilly |
| 2012/0165629 A1 | 6/2012 | Merritt et al. |
| 2012/0179006 A1* | 7/2012 | Jansen ................. A61B 5/0205 600/301 |
| 2012/0209082 A1 | 8/2012 | Al-Ali |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0041591 A1 | 2/2013 | Lamego |
| 2013/0060147 A1 | 3/2013 | Welch et al. |
| 2013/0096405 A1 | 4/2013 | Garfio |
| 2013/0109927 A1 | 5/2013 | Menzel |
| 2013/0253334 A1 | 9/2013 | Al-Ali et al. |
| 2013/0296672 A1 | 11/2013 | O'Neil et al. |
| 2013/0331660 A1 | 12/2013 | Al-Ali et al. |
| 2013/0345921 A1 | 12/2013 | Al-Ali et al. |
| 2014/0166076 A1 | 6/2014 | Kiani et al. |
| 2014/0180160 A1 | 6/2014 | Brown et al. |
| 2014/0187973 A1 | 7/2014 | Brown et al. |
| 2014/0191709 A1* | 7/2014 | Celentano ................. H02J 50/90 320/108 |
| 2014/0275871 A1 | 9/2014 | Lamego et al. |
| 2014/0275872 A1 | 9/2014 | Merritt et al. |
| 2014/0316217 A1 | 10/2014 | Purdon et al. |

(56) References Cited

U.S. PATENT DOCUMENTS

| | | |
|---|---|---|
| 2014/0316218 A1 | 10/2014 | Purdon et al. |
| 2014/0323897 A1 | 10/2014 | Brown et al. |
| 2014/0323898 A1 | 10/2014 | Purdon et al. |
| 2015/0005600 A1 | 1/2015 | Blank et al. |
| 2015/0011907 A1 | 1/2015 | Purdon et al. |
| 2015/0073241 A1 | 3/2015 | Lamego |
| 2015/0080754 A1 | 3/2015 | Purdon et al. |
| 2015/0099950 A1 | 4/2015 | Al-Ali et al. |
| 2015/0106121 A1* | 4/2015 | Muhsin .............. G16H 50/30 705/2 |
| 2015/0366507 A1 | 12/2015 | Blank et al. |
| 2016/0166210 A1* | 6/2016 | Al-Ali .............. A61B 5/02416 600/323 |
| 2016/0196388 A1 | 7/2016 | Lamego |
| 2016/0324488 A1 | 11/2016 | Olsen |
| 2016/0367173 A1 | 12/2016 | Dalvi et al. |
| 2017/0024748 A1 | 1/2017 | Haider |
| 2017/0042488 A1 | 2/2017 | Muhsin |
| 2017/0055851 A1 | 3/2017 | Al-Ali |
| 2017/0055882 A1 | 3/2017 | Al-Ali et al. |
| 2017/0055887 A1 | 3/2017 | Al-Ali |
| 2017/0055896 A1 | 3/2017 | Al-Ali |
| 2017/0173632 A1 | 6/2017 | Al-Ali |
| 2017/0251974 A1 | 9/2017 | Shreim et al. |
| 2017/0311891 A1 | 11/2017 | Kiani et al. |
| 2018/0008146 A1 | 1/2018 | Al-Ali et al. |
| 2018/0103874 A1 | 4/2018 | Lee et al. |
| 2018/0199871 A1 | 7/2018 | Pauley et al. |
| 2018/0213583 A1 | 7/2018 | Al-Ali |
| 2018/0242926 A1 | 8/2018 | Muhsin et al. |
| 2018/0247353 A1 | 8/2018 | Al-Ali et al. |
| 2018/0247712 A1 | 8/2018 | Muhsin et al. |
| 2018/0248406 A1* | 8/2018 | Bae .............. H02J 7/02 |
| 2018/0256087 A1 | 9/2018 | Al-Ali et al. |
| 2018/0296161 A1 | 10/2018 | Shreim et al. |
| 2018/0300919 A1 | 10/2018 | Muhsin et al. |
| 2018/0310822 A1 | 11/2018 | Indorf et al. |
| 2018/0310823 A1 | 11/2018 | Al-Ali et al. |
| 2018/0317826 A1* | 11/2018 | Muhsin .............. A61B 5/14552 |
| 2019/0015023 A1 | 1/2019 | Monfre |
| 2019/0058280 A1 | 2/2019 | Al-Ali et al. |
| 2019/0058281 A1 | 2/2019 | Al-Ali et al. |
| 2019/0117070 A1 | 4/2019 | Muhsin et al. |
| 2019/0133445 A1* | 5/2019 | Eteminan .............. A61B 5/1112 |
| 2019/0200941 A1 | 7/2019 | Chandran et al. |
| 2019/0239787 A1 | 8/2019 | Pauley et al. |
| 2019/0320906 A1 | 10/2019 | Olsen |
| 2019/0320988 A1 | 10/2019 | Ahmed et al. |
| 2019/0374139 A1 | 12/2019 | Kiani et al. |
| 2019/0374173 A1 | 12/2019 | Kiani et al. |
| 2019/0374713 A1 | 12/2019 | Kiani et al. |
| 2020/0021930 A1 | 1/2020 | Iswanto et al. |
| 2020/0060869 A1 | 2/2020 | Telfort et al. |
| 2020/0111552 A1 | 4/2020 | Ahmed |
| 2020/0113435 A1 | 4/2020 | Muhsin |
| 2020/0113488 A1 | 4/2020 | Al-Ali et al. |
| 2020/0113496 A1 | 4/2020 | Scruggs et al. |
| 2020/0113497 A1 | 4/2020 | Triman et al. |
| 2020/0113520 A1 | 4/2020 | Abdul-Hafiz et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkvist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |
| 2025/0037836 A1 | 1/2025 | Kiani |

* cited by examiner

MODULAR WIRELESS PHYSIOLOGICAL PARAMETER SYSTEM

RELATED APPLICATIONS

Any and all applications for which a domestic priority claim is identified in the Application Data Sheet of the present application are hereby incorporated by reference under 37 CFR 1.57. The present application is a continuation of U.S. patent application Ser. No. 16/717,882, filed Dec. 17, 2019, entitled "MODULAR WIRELESS PHYSIOLOGICAL PARAMETER SYSTEM," which claims priority benefit under 35 U.S.C. § 119(e) to U.S. Provisional Patent Application Ser. No. 62/781,527, filed Dec. 18, 2018, titled "MODULAR WIRELESS PHYSIOLOGICAL PARAMETER SYSTEM"; and to U.S. Provisional Patent Application Ser. No. 62/808,708, filed Feb. 21, 2019, titled "MODULAR WIRELESS PHYSIOLOGICAL PARAMETER SYSTEM"; all of the above-referenced patent applications are hereby incorporated in their entireties by reference herein.

BACKGROUND

Field

The present disclosure relates to modular wireless physiological monitoring systems.

Background of Technology

Conventional sensor systems collect patient physiological data using various physiological sensors (for example, pulse oximeter, electrocardiogram (ECG), blood pressure, respiratory monitors, and the like), process the data, and display the data on a display device. Typically, multiple sensors are attached to a patient, each with its own wire or sets of wires leading to a patient monitoring system. The multiple wires can create a web of tangled and unsightly wires which can inhibit patient movement and transport and care provider space and movement around a patient bed.

SUMMARY

The present disclosure provides a robust modular wireless patient monitoring system. A wired or wireless sensor communicates with a wireless processing module. The processing module can wirelessly communicate with a multiparameter patient monitoring display device. The processing module can be incorporated into a housing to create a fully sealed and self-contained processing system, with or without its own display. The processing module can be waterproof, having no or only limited waterproof ports. For example, when communicating with a wired sensor, the processing module can have a waterproof sensor port. The processing module can couple to a mounted wireless charging dock. The wireless charging dock can wirelessly provide power to the processing module as well as providing a mount support. The wireless charging dock can be mounted to a pole, a bed, a wall, the ceiling or elsewhere. In use, the processing module can be attached to the wireless charging dock using either magnets and/or another connection and retention system. The processing module can be easily coupled and removed without affecting measurements because the charging dock only supplies charging power to the processing module and there are no other communication wires between the processing module and the multiparameter patient monitoring display device. Thus, the processing modules can be quickly removed when additional care provider or patient movement is needed and then easily replaced for charging and room organization. The wireless charging dock and processing module can couple together using magnets to provide for easily coupling and removal.

According to an aspect, a system for monitoring patient physiological parameters is disclosed. The system can include a patient sensor configured to detect physiological information and output a signal representative of the physiological information. The system can also include a processing module in communication with the patient sensor and can be configured to receive the signal and determine one or more physiological measurements from the signal. The processing module can include at least a wireless transmitter configured to communicate the physiological measurements and/or the signal. The processing module may have no external power connectors. The system can also include a patient monitoring system comprising at least a first receiver configured to receive the physiological measurements and/or the signal from the processing module and communicate with a display device for displaying the received physiological measurements and/or the signal for display. The system can also include a mounted wireless charging dock configured to wirelessly couple to and charge the processing module.

The signal can be associated with at least one or more of the following health parameters: blood pressure, blood oxygen saturation level, heart rate, body temperature, or respiratory rate. The processing module and the wireless charging dock can be magnetically coupled. The patient sensor and the processing module can be in wireless communication. The patient sensor can be physically coupled to the processing module. The physical coupling between the patient sensor and the processing module can be waterproof.

The system can also include a notification system. The notification system can include a second receiver configured to receive the physiological parameters and/or the signal from the processing module. The notification system can also include a display system configured to display the received physiological parameters and/or the signal for display. The notification system can display a subset of the physiological parameters and/or the signal. The display system can use different color schemes for different types of physiological measurements. The display system can include a transparent organic light emitting device (OLED) display. The notification system can also include an alarm system configured to generate auditory and/or visual alarms. The patient monitoring system can generate a first status data based at least on the one or more physiological measurements, the first status data associated with patient health condition. The notification system can use different color schemes for the physiological parameters based at least on the first status data. The display system can use different color schemes based at least on the first status data.

The processing module can include an inset surface dimensioned to receive the wireless charging dock. The inset surface can be quadrilateral in shape. The inset surface can include one or more notches configured to removably couple with one or more grooves of the wireless charging dock. The one or more notches can be formed on one or more sides of the inset surface. The inset surface can include two notches formed on opposing sides of the inset surface. The processing module can include one or more grip elements. The one or more grip elements can be disposed on side surfaces of the processing module.

According to another aspect, a system for monitoring patient physiological parameters is disclosed. The system can include a patient sensor configured to detect physiological information and output a signal representative of the physiological information. The system can include a processing module in communication with the patient sensor and configured to receive the signal and determine one or more physiological measurements from the signal. The processing module can include at least a wireless transmitter configured to communicate the physiological measurements and/or the signal. The system can also include a notification module including at least a receiver configured to receive the signal from the processing module. The notification module can also include a display system for displaying the received physiological measurements and/or the signal for display. The notification module can also include an alarm system configured to generate auditory and/or visual alarms based at least on the physiological measurements.

The signal can be associated with at least one or more of the following health parameters: blood pressure, blood oxygen saturation level, heart rate, body temperature, or respiratory rate. The display system can display a subset of the one or more physiological measurements. The notification module can use different color schemes for different types of physiological measurements. The processing module can generate a first status data based at least on the one or more physiological measurements. The first status data can be associated with patient health condition. The notification module can receive the first status data from the processing module. The notification system can use different color schemes for the physiological parameters based at least on the first status data. The alarm system can generate the auditory and/or visual alarms based at least on the first status data. The display system can include a transparent display. The display system can include an organic light emitting display (OLED). The notification module and/or the display system can be programmable to only display parameters with alarm conditions. The notification module and the display module can be programmed directly or remotely.

DETAILED DESCRIPTION

Figure 1A:
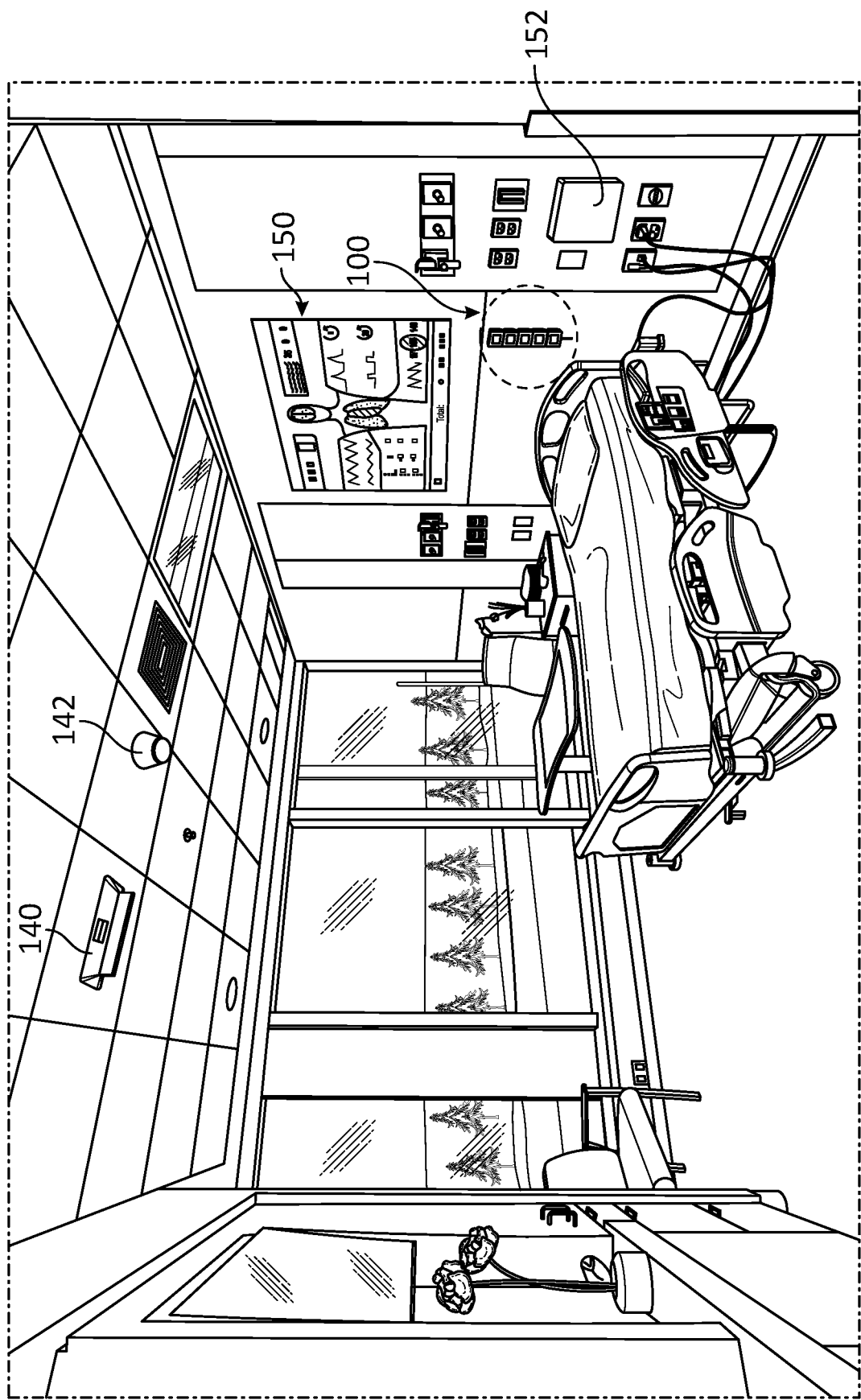
FIG. 1A illustrates an embodiment of a patient monitoring system including a sensor system receiving patient physiological data and wirelessly transmitting the data to a monitoring device.

FIG. 1A illustrates an example of a sensor system 100 incorporated with various types of patient monitoring modules. The sensor system 100 can be used in conjunction with an alarm system 140 and a camera 142. The alarm system 140 may be able to generate auditory and visual alarms when certain conditions are met. The sensor system 100 can establish wireless communication with a multiparameter patient monitoring system (MPMS) 152 such that patient physiological data can be wirelessly transmitted between the sensor system 100 and the MPMS 152. The MPMS 152 can transmit patient physiological data to a display 150 wirelessly or via a cable.

The MPMS 152 can function as a server for a patient room. The MPMS 152 can be connected to a hospital Wi-Fi network, cloud, or any other secured networks such that patient information may be stored. The MPMS 152 can wirelessly communicate with the sensor system 100 in layered communications. For example, the MPMS 152 and the sensor system 100 can utilize Wi-Fi as a main method of wireless communication. However, when Wi-Fi is no longer available, the MPMS 152 and the sensor system 100 can utilize other wireless communication protocols such as cellular, near-field communication (NFC), or Bluetooth® for wireless communication. The use of wireless communication protocol can advantageously eliminate use of cables between the MPMS 152 and the sensor system 100.

The sensor system 100 and the MPMS 152 can communicate over a layered distributed wireless communication network system. As discussed above, the sensor system 100 and the MPMS 152 can communicate over a primary communication network that can include a remote processor in a remote location. In certain circumstances in which the primary communication network is no longer available, the sensor system 100 and the MPMS 152 can establish a secondary communication network in which the MPMS 152 can act as a processor for the secondary communication network. In some examples, the primary communication network is a Wi-Fi network and the secondary communication network is a Bluetooth® network. The sensor system 100 and the MPMS 152 can communicate over a network that is centralized or a network that includes multiple subnetworks. Additionally or alternatively, the sensor system 100 and the MPMS 152 can be a part of the multiple subnetworks that together comprise a larger, singular network.

The MPMS 152 can store patient physiological data in a network (or a server). It can be advantageous to store patient data in a network because clinicians, patients, or care providers can access patient data regardless of their location. The MPMS 152 can receive patient physiological data from the sensor system 100 and store at least a portion of the data in the network. The patient physiological data may be encrypted prior to being stored in a network for security and/or regulatory compliance purposes.

The network can allow different levels of access to the patient data to different people. For example, care providers may be able to access all of the patient data. On the other hand, care providers may only be able to access certain non-sensitive portions of the patient data including, but not limited to, weight, height, blood pressure measurements, blood oxygen saturation, and the like. Patients may be able to grant access to their patient data to certain people such as their immediate family or care provider.

The alarm system 140 can be used in connection with the sensor system 100. For example, if a patent is experiencing a life-threatening event or the patient's physiological parameters are within a predetermined range, the alarm system 140 can generate an auditory or visual alarm. The visual alarm can be generated on the display 150 or be a light from the alarm system 140 itself. The signals for generating alarms can be transmitted by the sensor system 100 or the MPMS 152. The signals may be transmitted wirelessly to the alarm system 140 via Wi-Fi connection or various other wireless communication protocols including NFC, Bluetooth®, Li-fi. ZigBee, Z-Wave, radio-frequency identification (RFID), Bluetooth Low Energy (BLE), and the like. The alarm system 140 can be placed, as shown in FIG. 1A, on a ceiling of a patient room, next to a bed of a patient, on one of the walls, next to an entrance to a patient room, and the like.

The camera 142 can be used in connection with the sensor system 100 to monitor and/or detect movements in a patient room. The camera 142 can record a video or take pictures of the room. For example, the camera 142 may be able to detect a patient falling off his bed and send an appropriate notification or alarm to a care provider. The camera 142 can detect who walks in or out of the room. It can be advantageous to collect information from the camera 142 and the alarm system 140 to provide more complete understanding of a patient. For example, the alarm system 140 may be configured to generate an alarm if a patient's heart rate increases by 30% within 10 seconds. However, the alarm system 140 may not generate an alarm if it receives a signal from the camera 142 that the patient is simply exercising rather than having a complication. The camera 142 can be configured to detect certain sounds or noises to provide additional information to the alarm system 140.

Figure 1B:
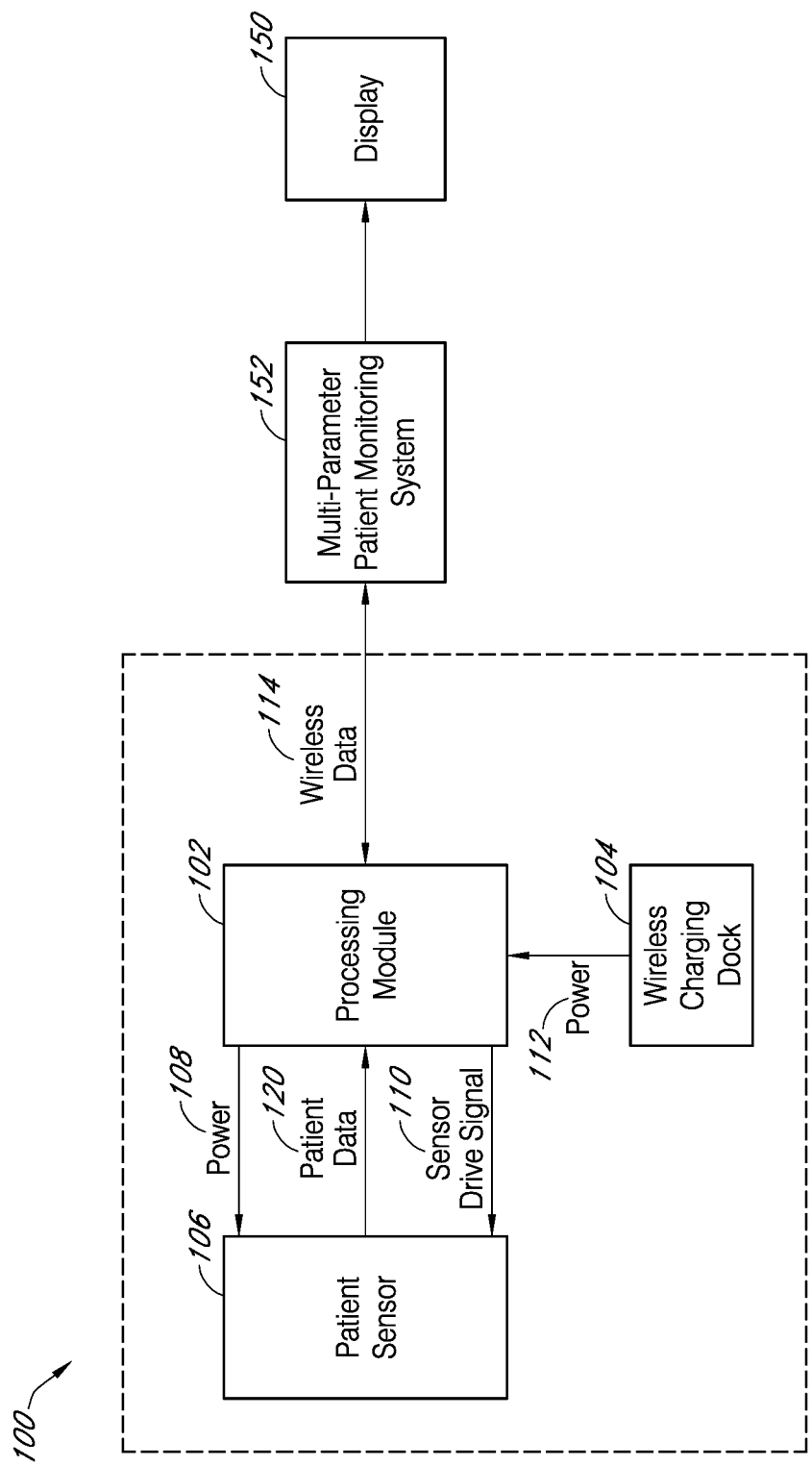
FIG. 1B illustrates a schematic diagram of the patient monitoring system of FIG. 1A.

FIG. 1B illustrates a schematic diagram showing the sensor system 100 in communication with the MPMS 152. The sensor system 100 can include a processing module 102, a wireless charging dock 104, and a patient sensor 106.

The patient sensors 106 can attach or couple to different parts of a patient such as, but not limited to, arms, legs, torso, chest, head, neck, fingers, forehead, and the like. The patient sensor 106 can collect patient physiological data including, but not limited to, raw data related to heart rate, ECG, respiration, blood pressure, blood oxygen saturation, total hemoglobin, temperature, and the like. The patient sensor 106 can transmit patient data 120 to the processing module 102 wirelessly or via a cable.

The patient data 120 transmitted to the processing module 102 can be raw data. Optionally, the patient sensor 106 can include a processor that can fully or partially process the raw data. The patient sensor 106 can transmit to the processing module 102 patient data 120 that is fully or partially processed. The processing module 102 can process the raw patient data using the processor 160 (see FIG. 1C).

The patient sensor 106 can couple to the processing module 102 such that the processing module 102 can optionally provide power 108 to the patient sensor 106. The power 108 can supply power for various components of the patient sensor 106 including, but not limited to, sensor elements and/or processors. The patient sensor 106 can use the power 108 to collect patient physiological data as further described below.

The processing module 102 can also transmit a sensor drive signal 110 to the patient sensor 106. The sensor drive signal 110, for example, can include a drive signal for one or more emitters or other sensor element drive signals. The patient sensor 106 can send sensed physiological information to the processing module 102 via the sensor drive signal 110. The processing module 102 can read one or more information elements on the patient sensor 106 to determine if the patient sensor 106 is a valid and non-expired patient sensor 106.

The MPMS 152 can receive wireless data 114 from the processing module 102. The wireless data 114 can include patient physiological data collected by the patient sensor 106. The MPMS 152 can display the physiological data on a display 150. The display 150 can be integrated with the MPMS 152 or be modular. The MPMS 152 can include one or more transceivers that can establish wireless communication protocol with the processing module 102 (for example, NFC and Bluetooth®). Alternatively, the display 150 and the MPMS 152 can be coupled via a cable.

The MPMS 152 can be a hospital patient monitoring system, which can include receiving data from multiple different physiological sensing systems, generate displayable information and cause the patient health data to be displayed, for example on display 150. The MPMS 152 and the display 150 can be coupled via a cable. Alternatively, the MPMS 152 and the display 150 can communicate wirelessly. For example, the MPMS 152 can be a Root® Platform, a patient monitoring and connectivity platform available from Masimo Corporation, of Irvine, CA. A mobile physiological parameter monitoring system usable with the cable is described in U.S. Pat. No. 9,436,645, issued on Sep. 6, 2016, titled "MEDICAL MONITORING HUB," the disclosure of which is hereby incorporated by reference in its entirety. The MPMS 152 can be a mobile monitoring system or a personal mobile device.

Figure 1C:
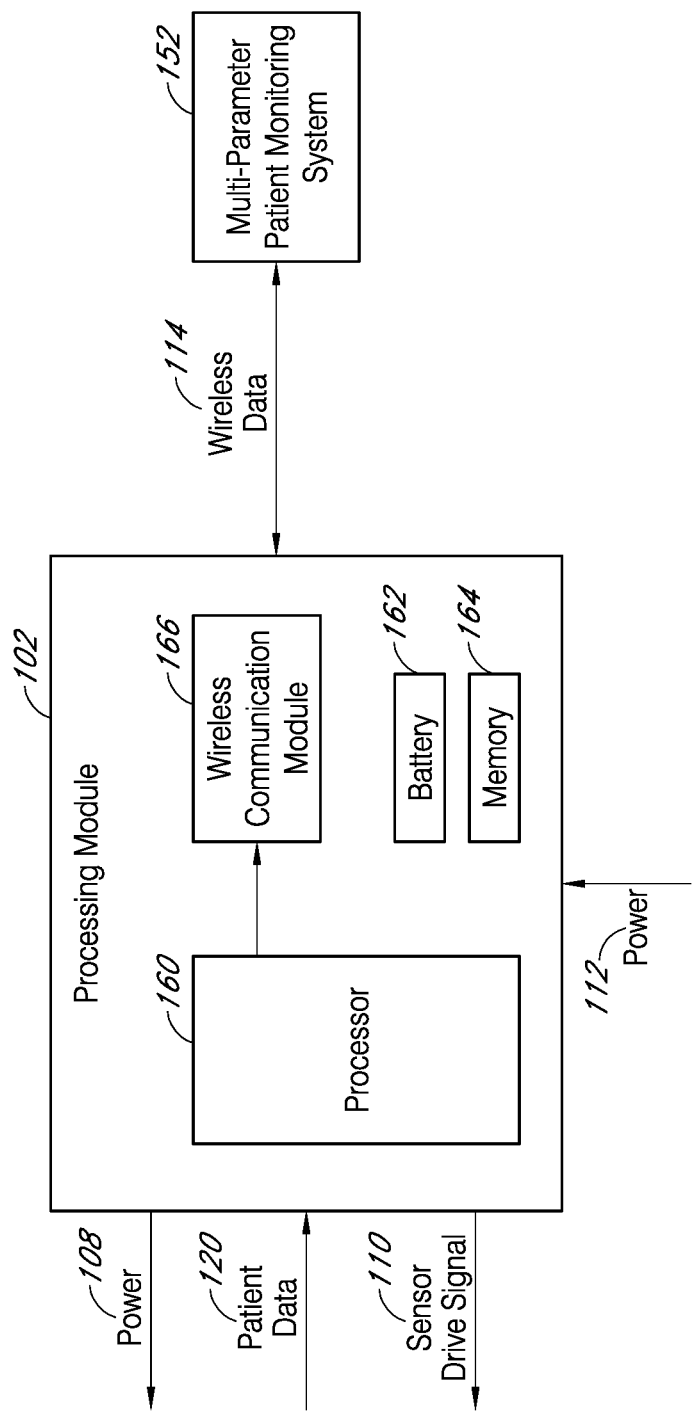
FIG. 1C illustrates a schematic diagram of a processing module of the patient monitoring system of FIG. 1B.

FIG. 1C illustrates a schematic diagram showing additional details of the processing module 102. The processing module 102 can include a processor 160, a battery 162, a memory 164, and a wireless communication module 166. The processing module 102 can provide the power 108 to the patient sensor 106. In addition or alternatively to providing direct power 108, the processing module 102 can transmit sensor drive signal 110 to the patient sensor 106. The processor can receive patient data 120 from the patient sensor 106.

The memory 164 can be configured to store data for the processing module 102. The data can be volatile or non-volatile. The memory can be a random-access memory (RAM), dynamic random-access memory (DRAM), synchronous DRAM (SDRAM), read-only memory (ROM), programmable read-only memory (PROM), erasable programmable read-only memory (EPROM), electronically erasable programmable read-only memory (EEPROM), and the like. The processing module 102 can be configured to store the raw or partially processed patient data 120 in the memory 164 and transmit the patient data 120 to the MPMS 152 when it establishes communication with the MPMS 152. The storing of the patient data 120 in the memory 164, establishing connection with the MPMS 152, and transmitting the patient data 120 to the MPMS 152 can be done automatically. Additionally or alternatively, the memory 164 can store processed or determined data based on the patient data 120. This processed or determined data can be wirelessly transmitted to the MPMS 152 in place of or along with the patient data 120.

The memory 164 can store the patient data 120 and/or processed or determined data before the processor 160 and wireless communication module 166 transmit the patient data 120 and/or processed or determined data to the MPMS 152 via the wireless communication module 166. It can be advantageous to configure the memory 164 to store the patient data 120 and/or processed or determined data when the processing module 102 is not in communication with the MPMS 152 because care providers may not have sufficient time to establish communication between the processing module 102 and the MPMS 152. In such critical circumstances, the memory 164 can store the patient data 120 and/or processed or determined data and transmit the patient data 120 and/or processed or determined data to the MPMS 152 using the wireless communication module 166 at a later time.

The wireless communication module 166 can include one or more transceivers configured to establish wireless communication with the MPMS 152. In some examples, the wireless communication module 166 can use Bluetooth® to establish wireless communication with the MPMS 152. The wireless communication module 166 can include a first transceiver configured as a receiving transceiver and a second transceiver configured as a transmitting transceiver. The receiving transceiver and the transmitting transceiver can use the same or different wireless communication protocols to communicate with the MPMS 152. In some examples, the wireless communication module 166 can include a first transceiver configured to establish a RFID communication or NFC and a second transceiver configured to establish a Bluetooth® communication.

The wireless communication module 166 can establish wireless connection with the MPMS 152 when the processing module 102 is brought within a predetermined distance to the MPMS 152. Once wireless connection is established, the wireless communication module 166 can send the wireless data 114 to the MPMS 152. As discussed above, the wireless data 114 can include the patient data 120 and/or processed or determined data. The MPMS 152 can include an RFID reader or other near field communication system that can communicatively couple the MPMS 152 with the wireless communication module 166. For example, when the processing module 102 is sufficiently proximate to the MPMS 152, the MPMS 152 can receive identifying information from the wireless communication module 166. Once the MPMS 152 receives the identifying information, the MPMS 152 can use the identifying information to associate the wireless communication module 166 with the MPMS 152. The identifying information may include airing parameters. Once associated, the processing module 102, via the wireless communication module 166, can connect with the MPMS 152 using pairing parameters. Alternatively, the MPMS 152 and the wireless communication module 166 can use other wireless communication protocols or standards.

The wireless charging dock 104 can additionally or alternatively be configured with an RFID reader or other near field communication system that can provide wireless communication information to the processing module 102 to allow the processing module 102 to pair and communicate with the MPMS 152. In this way, when a care provider docks the processing module 102 with the wireless charging dock 104, communications with the MPMS 152 can be established.

Figure 1D:
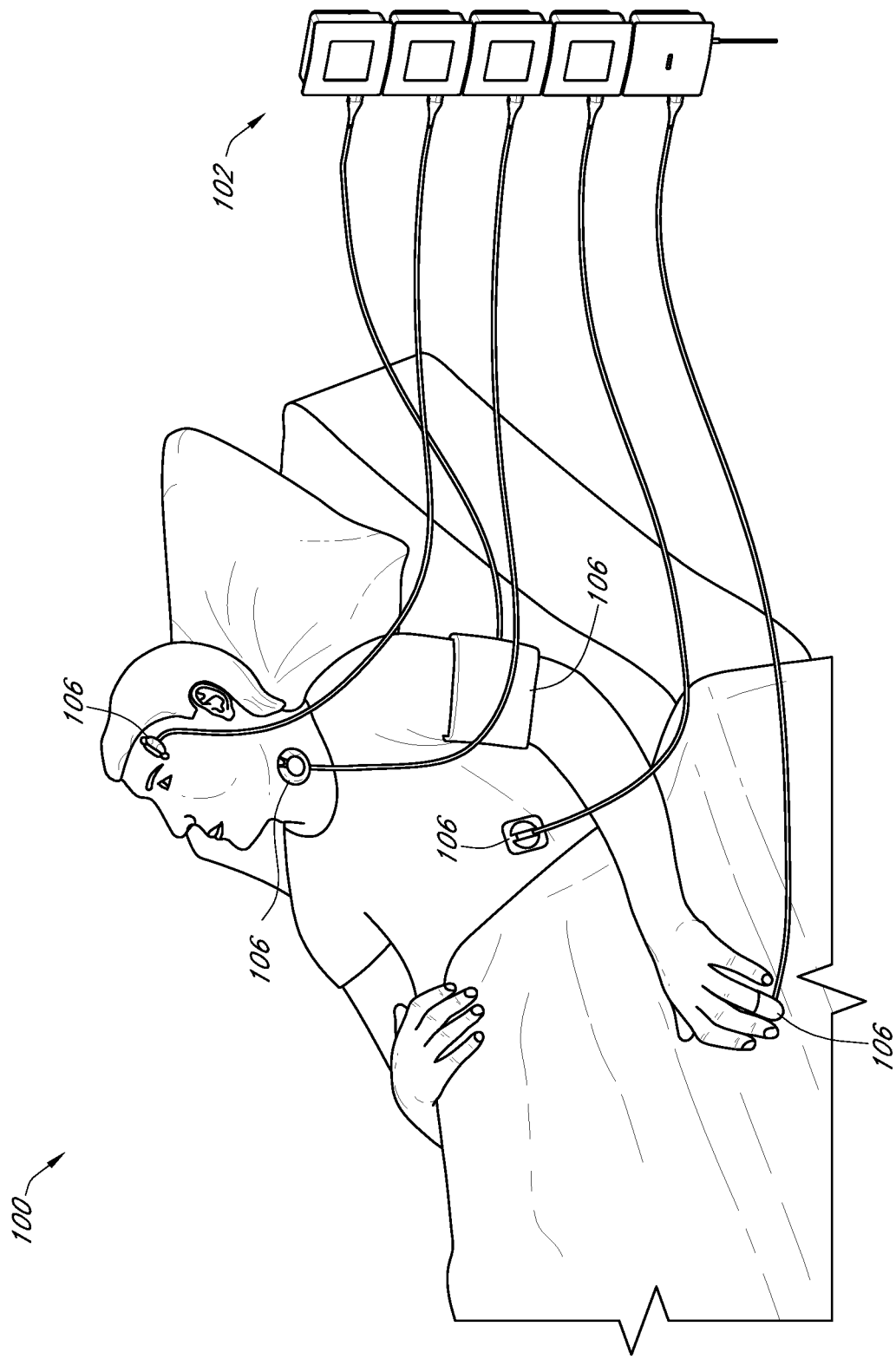
FIGS. 1D and 1E illustrate example sensors coupled to a patient and in communication with processing modules.
Figure 1E:
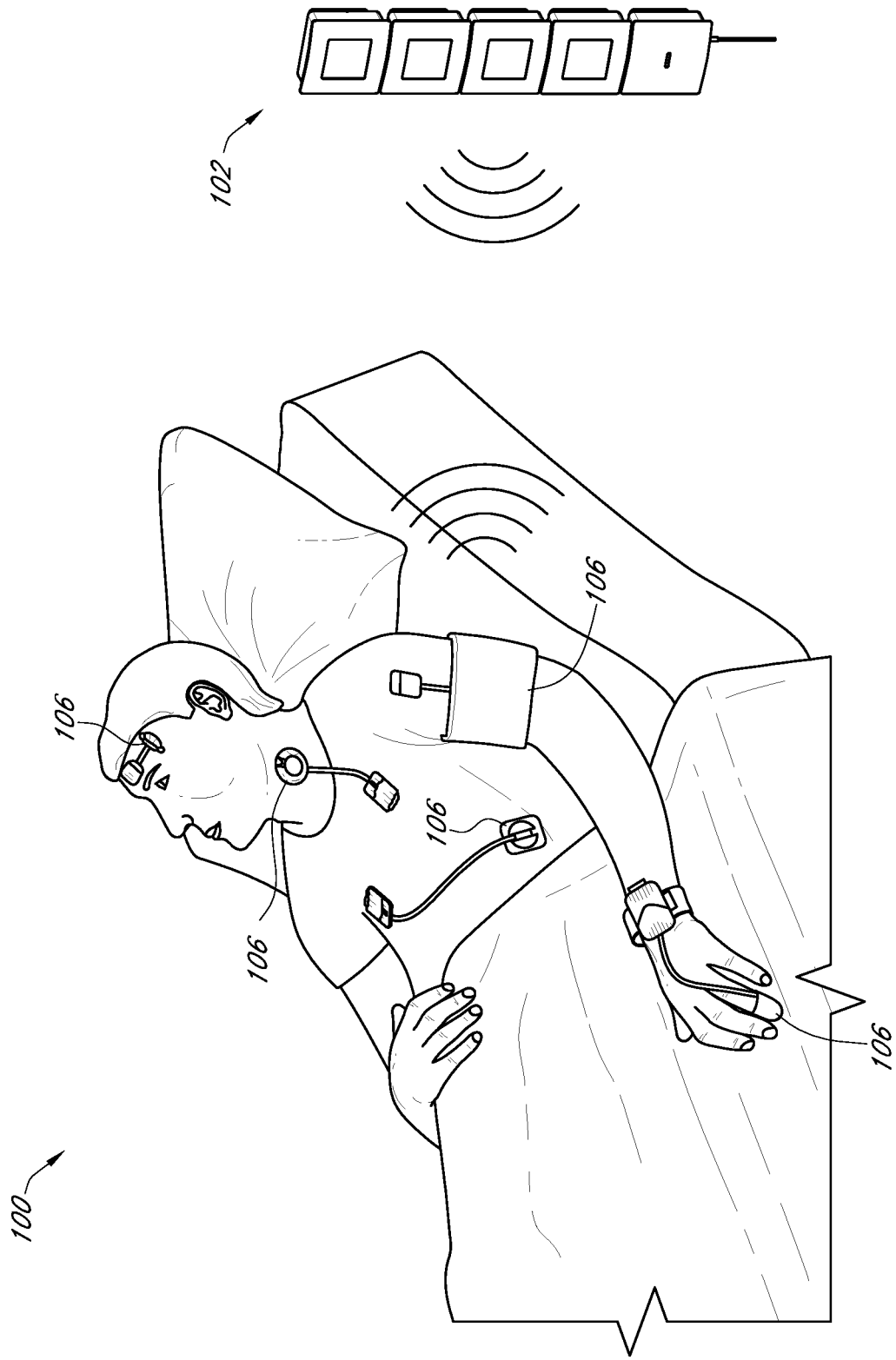

FIGS. 1D and 1E illustrate examples of patient sensors attached to a patient. As shown in FIG. 1D, different types of sensors can be used to measure different types of health parameters including, but not limited to, peripheral capillary oxygen saturation, blood pressure, temperature, heart rate, respiration rate, and the like. The sensors, as discussed above, can be attached to various locations of the patient.

The patient sensors 106 can establish communication with the processing modules 102. For example, the patient sensors 106 can be coupled to the processing modules 102 via cables, as shown in FIG. 1D or wirelessly. The processing modules 102 can transmit sensor drive signal 110 and power 108 to the patient sensors 106 via the cables. The processing modules 102 can receive patient data 120 from the patient sensors 106 via the cables. The patient sensors 106 can wirelessly communicate with the processing modules 102, as shown in FIG. 1E. The processing modules 102 can wirelessly transmit sensor drive signal 110 or other command signals to the patient sensors 106 and wirelessly receive patient data 120 from the patient sensor 106. In the example shown in FIG. 1E, the patient sensors 106 can include one or more transceivers that can establish wireless communication with the processing modules 102 and receive data from and/or transmit data to the processing modules 102.

Figure 2A:
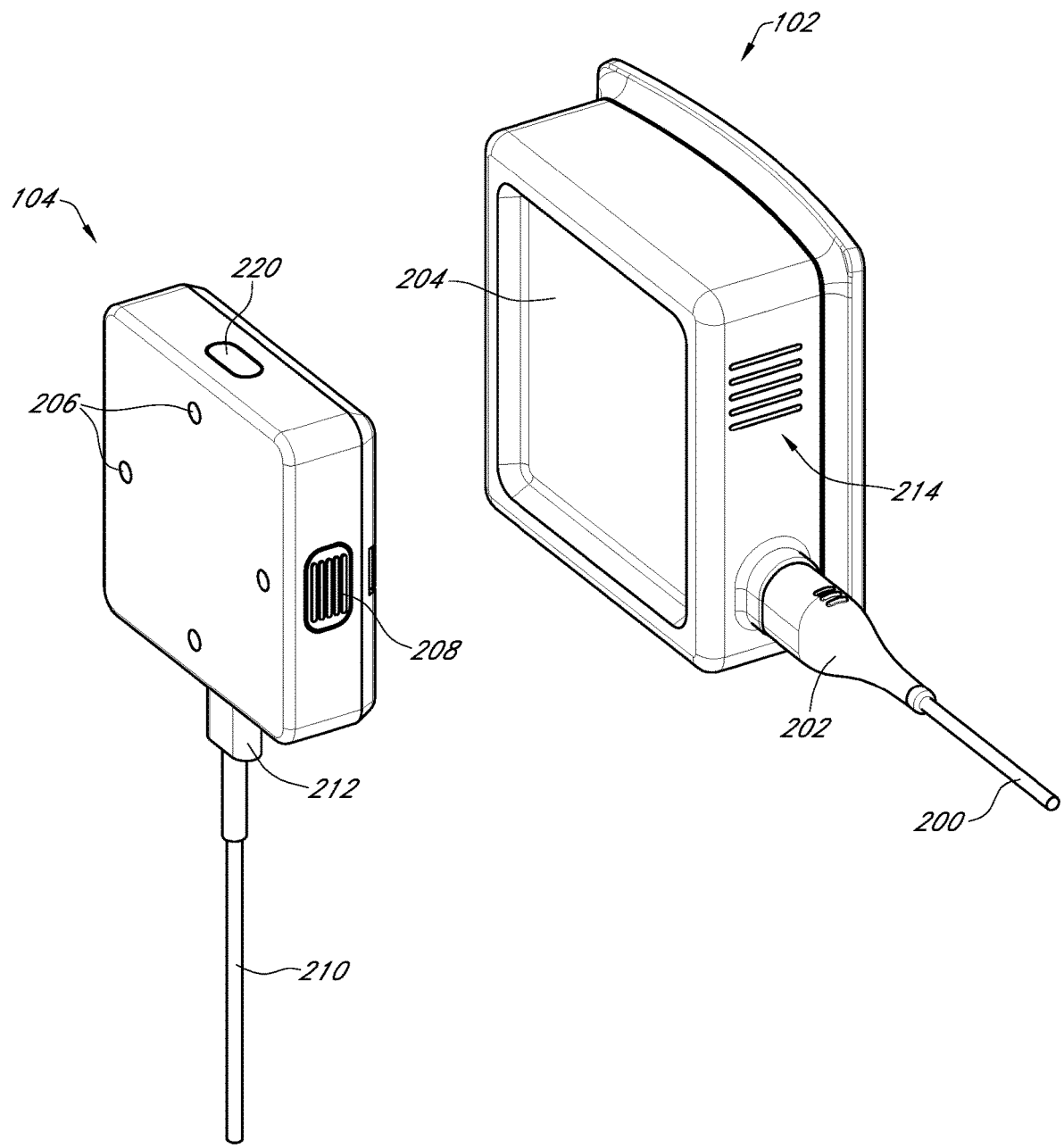
FIGS. 2A and 2B illustrate examples of a processing module and wireless charging dock.
Figure 2B:
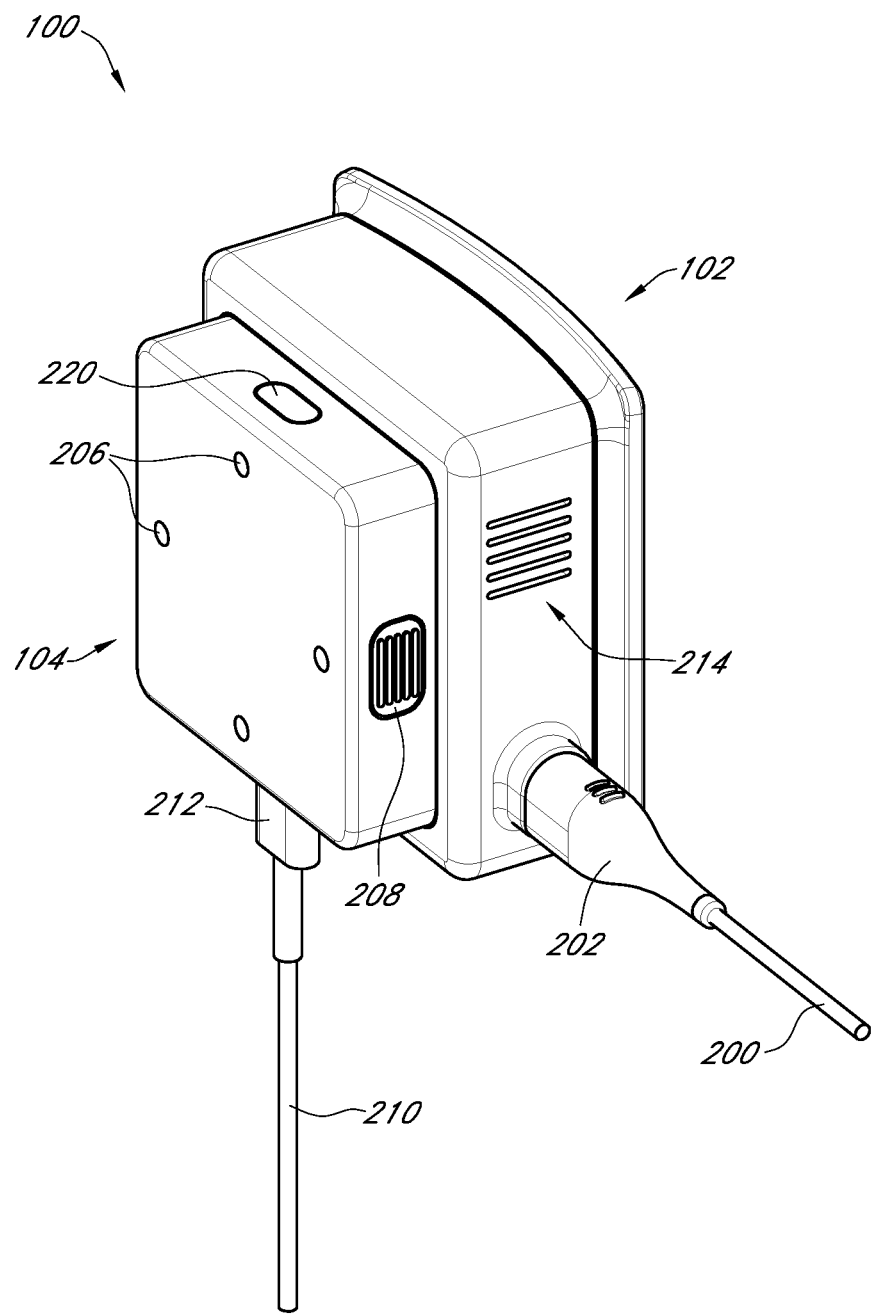

FIGS. 2A and 2B illustrate a processing module 102 and a wireless charging dock 104. When coupled, the wireless charging dock 104 can wirelessly provide power for the processing module 102 as well as physically support the processing module 102 as a docking location. The wireless charging dock 104 can include a power and/or data cable 210, a connector 212, one or more mounting points 206, a grip element 208, and a covered port 220. The processing module 102 can include an inset surface 204, speaker slots 214, and a port 300 (see FIG. 3A).

The wireless charging dock 104 can receive power via the cable 210 and the connector 212. Once the processing module 102 is brought proximate to or in contact with the wireless charging dock 104, the wireless charging dock 104 can wirelessly generate power 112 for the processing module 102 (see FIG. 1B). The power received via the cable 210 may be regulated (changing voltage or current) for wireless charging. For example, the wireless charging dock 104 may receive 110V AC power via the cable 210 and convert the 110V AC into 5V DC for wireless charging purposes. Alternatively, the wireless charging dock 104 may receive 5V DC current for wireless charging purposes so that all exposed cabling is lower power.

The wireless charging dock 104 can magnetically couple to the processing module 102, for example, as illustrated in FIG. 2B. The shape and the magnetic property of the wireless charging dock 104 allows it to removably couple with the inset surface 204 of the processing module 102. The use of magnetic coupling can advantageously allow the wireless charging dock 104 and the processing module 102 to be water resistant or waterproof. Moreover, the use of magnetic coupling can advantageously allow the connection between the wireless charging dock 104 and the processing module 102 (for wireless charging) to be waterproof. This is especially important in hostile environments such as surgery room or emergency room in hospitals. The magnetic coupling also allows for quick and easy connection and removal of the processing module 102 as needed for moving patients from one area to another area of the hospital. The magnetic coupling between the wireless charging dock 104 and the processing module 102 can provide sufficient force to hold them together.

Multiple different processing modules 102 for the same or different physiological parameters can be mixed and matched in any configuration with multiple mounted wireless charging docks 104. Thus, a care provider is not required to mount a particular processing module 102 with a specific wireless charging dock 104.

The shapes of the wireless charging dock 104 and the inset surface 204 may be square as shown in FIGS. 2A and 2B. The square shape of the wireless charging dock 104 and the inset surface 204 can advantageously allow the orientation of the processing module 102 to be rotated 90 degrees depending on the application. As another example, the shape of the wireless charging dock 104 and the inset surface 204 may be triangular, circular, hexagonal, or any other shapes sufficient to facilitate coupling between the wireless charging dock 104 and the processing module 102. Different configurations of the wireless charging dock 104 and the inset surface 204 can allow different angular orientations of the processing module 102 with respect to the wireless charging dock 104. The contact between the wireless charging dock 104 and the inset surface 204 can provide mechanical support between the wireless charging dock 104 and the processing module 102. In some examples, the wireless charging dock 104 can have an inset surface where the processing module 102 can be placed within. Alternatively, the processing module 102 can be designed without the inset surface 204 and, as discussed above, the magnetic coupling between the processing module 102 and the wireless charging device 104 may be sufficient to hold them together.

The mounting points 206 can be placed on a rear surface of the wireless charging dock 104. The mounting points 206 can be configured and sized to allow the wireless charging dock 104 to be mounted. The mounting points 206 may be configured to receive different types of screws. The wireless charging dock 104 can be mounted at various locations including, but not limited to a pole, a bed, a wall, the ceiling, and the like. Alternatively, other types of mounting mechanisms may be used to mount the wireless charging dock 104. The wireless charging dock 104 may also include a magnet such that it can removably couple to magnetic surfaces.

The grip element 208 can be positioned along side surfaces of the wireless charging dock 104 as shown in FIG. 2A. The grip element 208 can be a surface that includes one or more protrusions and/or indents. The grip element 208 can advantageously provide a gripping surface to use when separating the wireless charging dock 104 from the processing module 102 or docking the wireless charging dock 104 with the processing module 102.

The processing module 102 can include a speaker and one or more speaker slots 214 formed on its body. The speaker can create auditory alarms. The speaker slots 214 can advantageously allow auditory alarms to travel through and be heard. A waterproof membrane can be used to prevent liquid ingress to the wireless processor 102 through the speaker slots 214.

The magnetic coupling between the wireless charging dock 104 and the processing module 102 can advantageously allow care providers to quickly and easily couple or remove the processing module 102 when attending different patients. A care provider can use the processing module 102 to collect, transmit, and display patient data 120 for a first patient, and later use the same processing module 102 for a second patient without having to move sensors or move patients to different locations. Moreover, the lack of cables between the wireless charging dock 104 with the processing module 102 allows care providers to quickly install the processing module 102 and collect the patient data 120. The care provider can also quickly remove the processing modules 102 as needed for quick patient transport or where additional space around a patient is required.

The processing module 102 and the wireless charging dock 104 can each include wireless charging electronics. For example, the processing module 102 can include a first wireless charging electronics configured as a receiver and the wireless charging dock 104 can include a second wireless charging electronics configured as a transmitter. The magnetic coupling between the processing module 102 and the wireless charging dock 104 can bring the first wireless charging electronics and the second wireless charging electronics within a predetermined distance from each other. When the wireless charging electronics are brought within the predetermined distance from each other, the wireless charging electronics of the processing module 102 can generate power for the processing module 102. The wireless charging electronics of the processing module 102 and the wireless charging dock 104 can be configured such they do not generate power for the processing module 102 if the processing module 102 is not coupled to the wireless charging dock 104.

The covered port 220 can include a tab that can be waterproof or water resistant. The tab can either be left in place to maintain the waterproof housing or may be removed during manufacturing process of the wireless charging dock 104 and a cable assembly may be coupled to the covered port 220. The coupling of the cable assembly and the covered port 220 can be waterproof. In some examples, as shown in FIG. 8B, the cable assembly may include the cable 210 and the connector 212, which may couple to another wireless charging dock 104. In this regard, power can be transmitted between one wireless charging dock 104 to another wireless charging dock 104 via the cable 210 and the connector 212. When the cable assembly is removed from the covered port 220, a stopper or a cover may be placed on the covered port 220 to ensure that the covered port 220 is waterproof or water-resistant. The stopper (or cover) may be made of rubber.

Figure 3A:
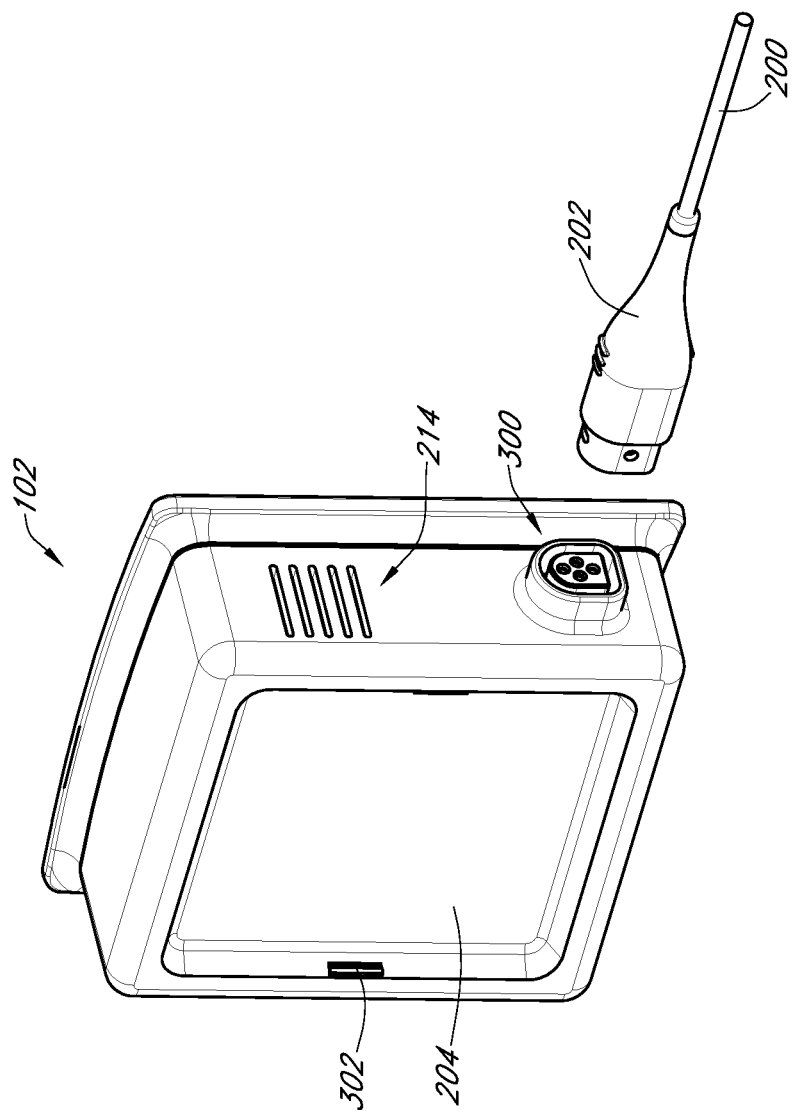
FIGS. 3A and 3B illustrate a port on the processing module for a wired physiological sensor.
Figure 3B:
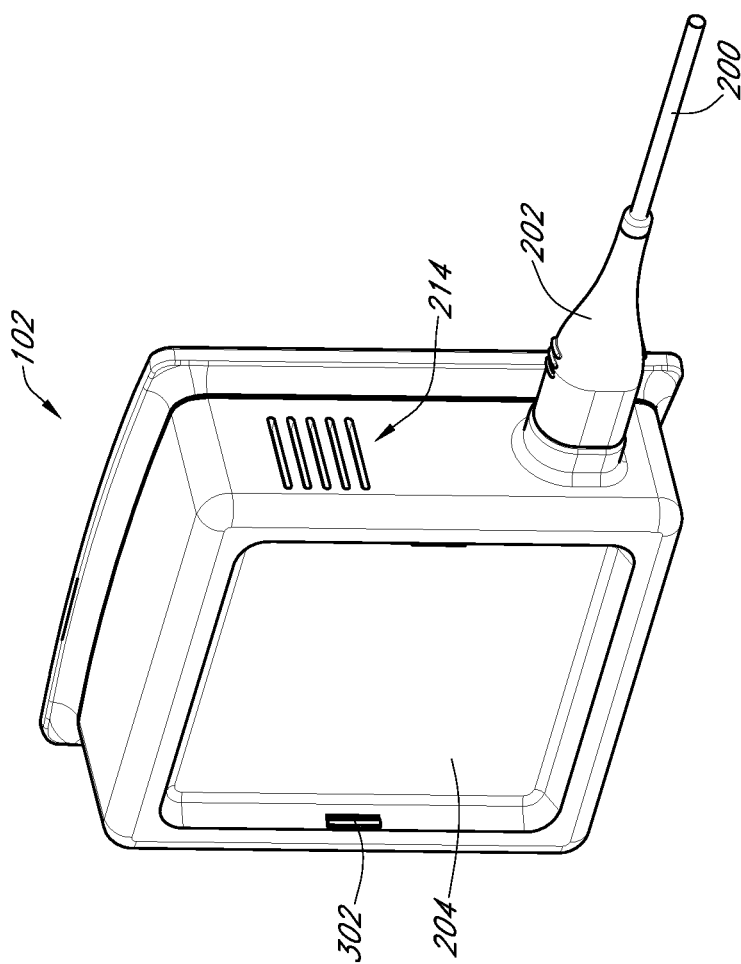

FIGS. 3A and 3B illustrate a port 300 on the processing module 102 and a cable 200. The port 300 can be waterproof. The cable 200 can couple to the patient sensor 106 and the processing module 102. Various types of signals including the power 108 and the sensor drive signal 110 may be transmitted between the processing module 102 and the patient sensor 106 via the cable 200. The cable 200 can include a connector 202. The connector 202 can allow the cable 200 to removably couple with the port 300. Additional details of the cable 200 and the cable 210 will be described below.

The inset surface 204 of the processing module 102 can include one or more notches 302. In the example shown in FIG. 3A, the notches 302 are formed on a side of the inset surface 204. The notches 302 can be formed on opposite sides of inset surface 204 or on all sides. Notches 302 can help provide physical support for the processing module 102 when coupled to the wireless charging dock 104 as described herein. The notches 302 are optional.

Figure 4B:
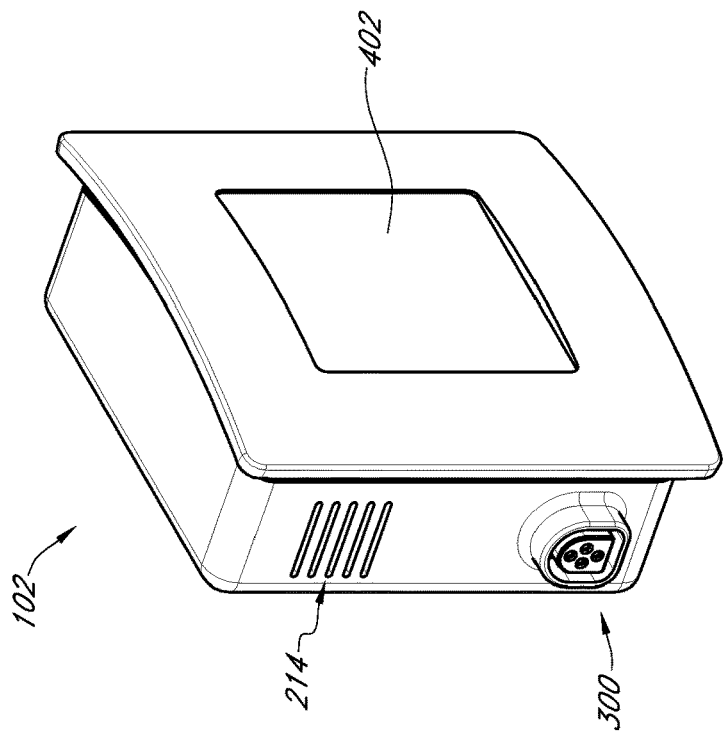
FIGS. 4A and 4B illustrate alternative examples of a processing module.
Figure 4A:
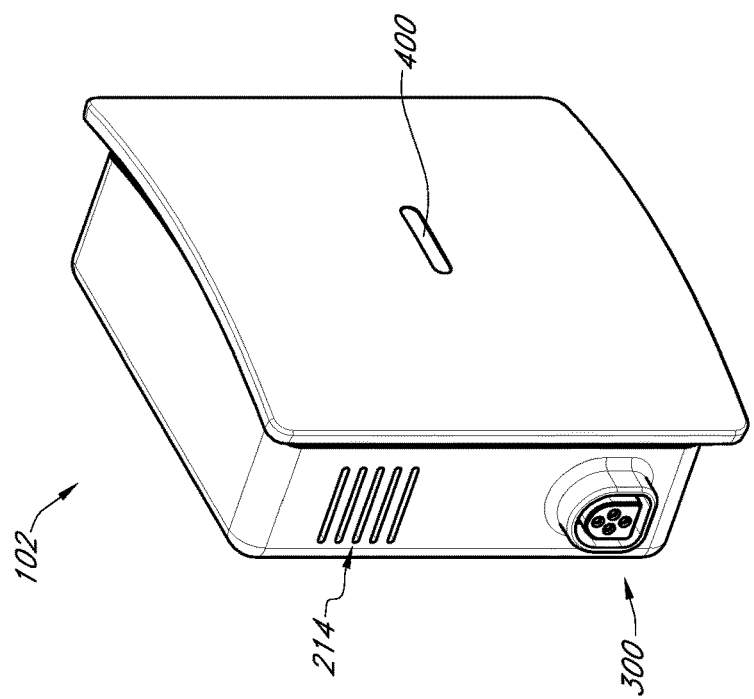

FIGS. 4A and 4B illustrate alternative examples of processing module 102. As shown in FIG. 4A, the processing module 102 can include an indicator 400. The indicator 400, in an example shown in FIG. 4A, is located on an opposite side of the inset surface 204. The indicator 400 can be a light emitting diode (LED), organic light emitting diode (OLED), or quantum dot light emitting diode (QLED) configured to illuminate different colors. For example, different colors may be used to indicate power level of the processing module 102. A red light can be used to show that the processing module 102 is low on power. A green light may be used to show that the processing module 102 is being charged by the wireless charging dock 104. A blue light may indicate that charging of the processing module 102 has been finished. Other light changes or colors can indicate a pairing or sensor collection in progress. Of course, any color of light, blinking, solid, fading effects can be used with any of the above. Audible notifications can be used as alternatives or in addition to light indicators for any of the above-described reasons.

The indicator 400 can use different colors to indicate different communication status between the processing module 102 and the MPMS 152. For example, a red light may indicate that there is no wireless communication protocol established with the processing module 102. A yellow light may indicate that the processing module 102 is in the process of establishing or searching for wireless communication. A blue light may indicate that a wireless communication protocol has been established between the processing module 102 and the MPMS 152. Different color combinations, blinking and/or solid patterns, fading effects, and the like may be used to indicate different communication status between the processing module 102 and the MPMS 152.

The processing module 102 can include a display 402. The display 402 can illustrate various patient parameter readings, patient parameter graphs, patient alarms, medication history, medication list, and the like. The display 402, in some examples, can be a touchscreen. The display 402 can be used to provide and/or receive data such as medication provided, patient condition, health parameter value, health parameter name, and the like. The display 402 can be an LED display, an OLED display, or a QLED display.

Figure 5B:
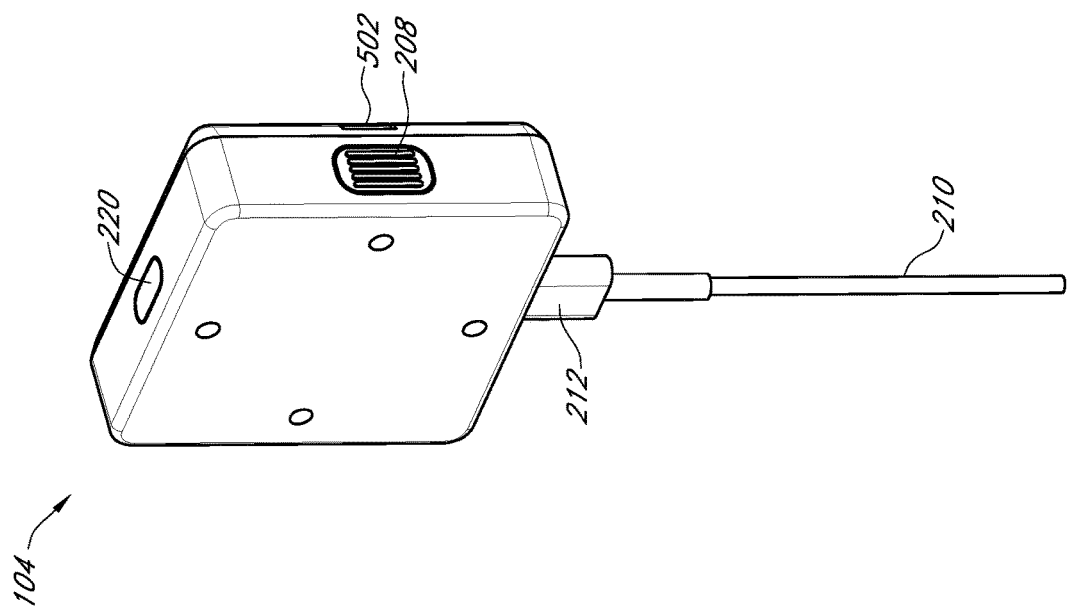
FIGS. 5A and 5B illustrate alternative examples a wireless charging docks.
Figure 5A:
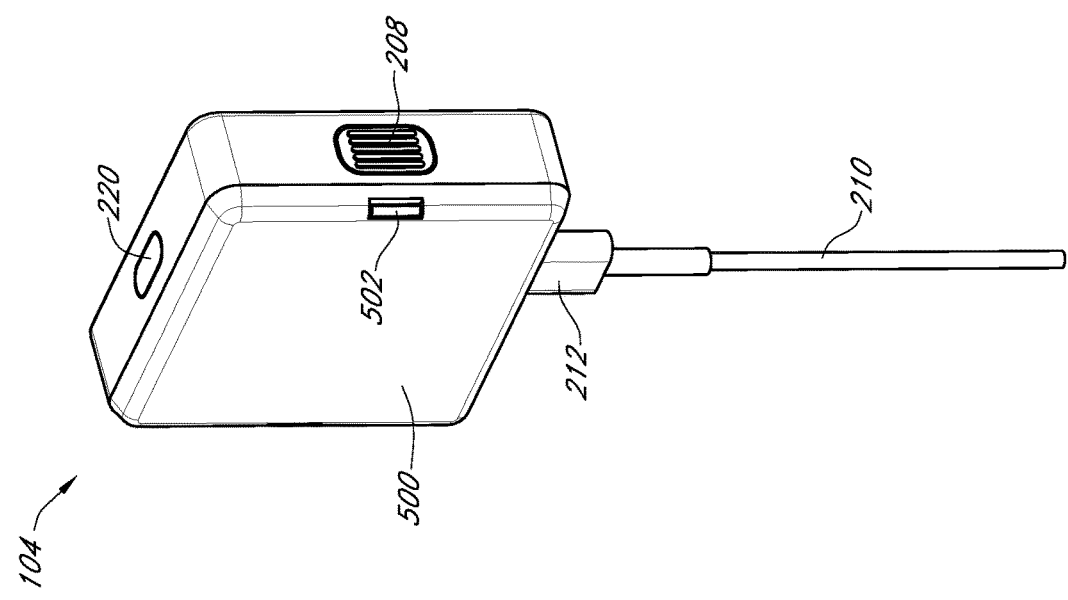

FIGS. 5A and 5B illustrate various views of the wireless charging dock 104. As discussed above, the wireless charging dock 104 can removably couple with the inset surface 204 of the processing module 102. The wireless charging dock 104 can include one or more grooves 502 formed on one or more edges of the mating surface 500. The grooves 502 can couple with the notches 302 (see FIGS. 3A and 3B) of the inset surface 204. The coupling of the grooves 502 and the notches 302 can advantageously provide additional support to hold the wireless charging dock 104 and the processing module 102 together. The grooves 502 can provide a mere tension surface that does not lock the processing module 102 in place to allow for easy removal. Alternatively, the grooves 502 can provide a lock or high-tension mount to provide a more secure dock to the processing module 102.

Figure 6A:
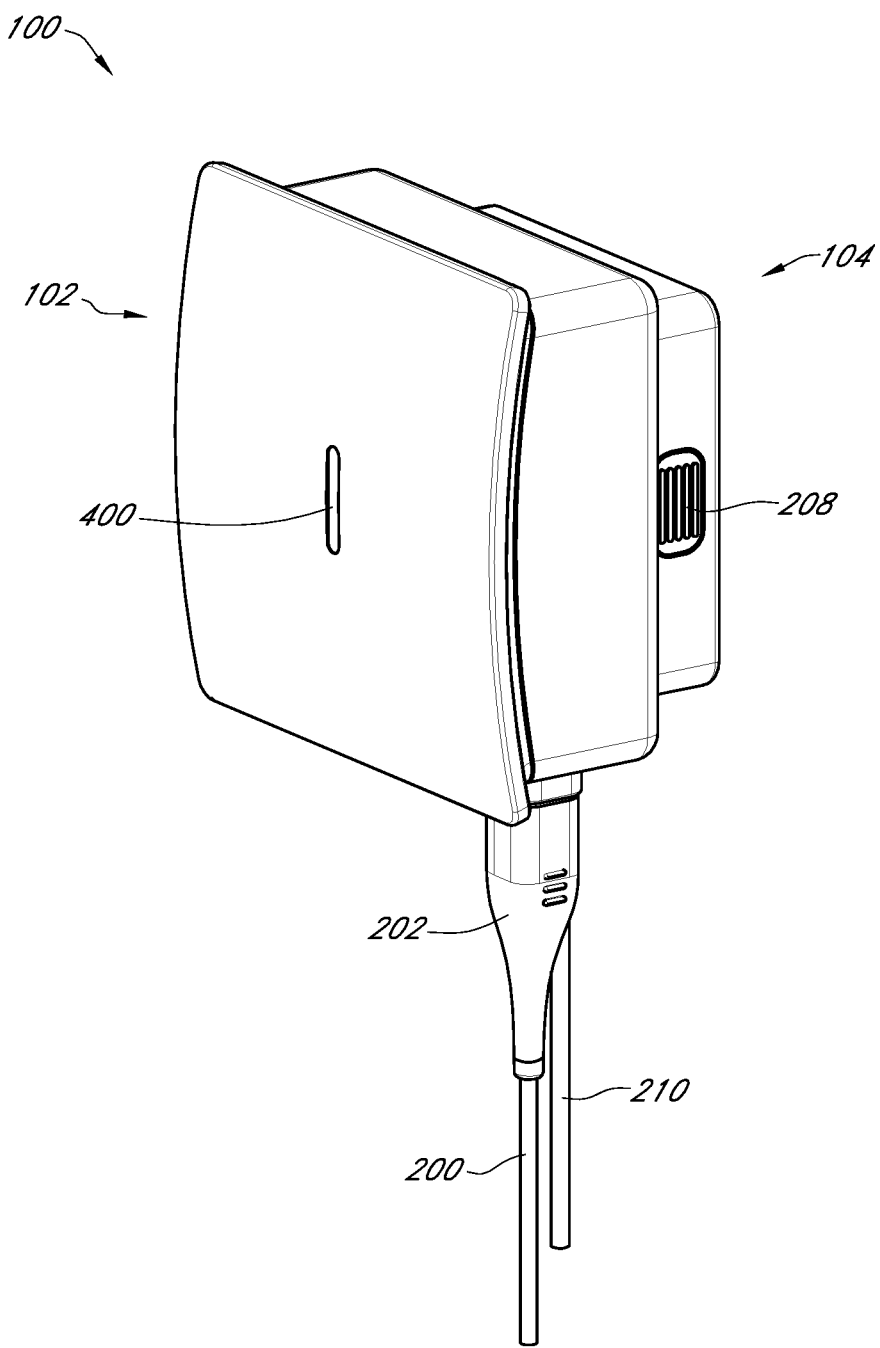
FIGS. 6A and 6B illustrate an example processing module coupled to an example wireless charging dock in various orientations.
Figure 6B:
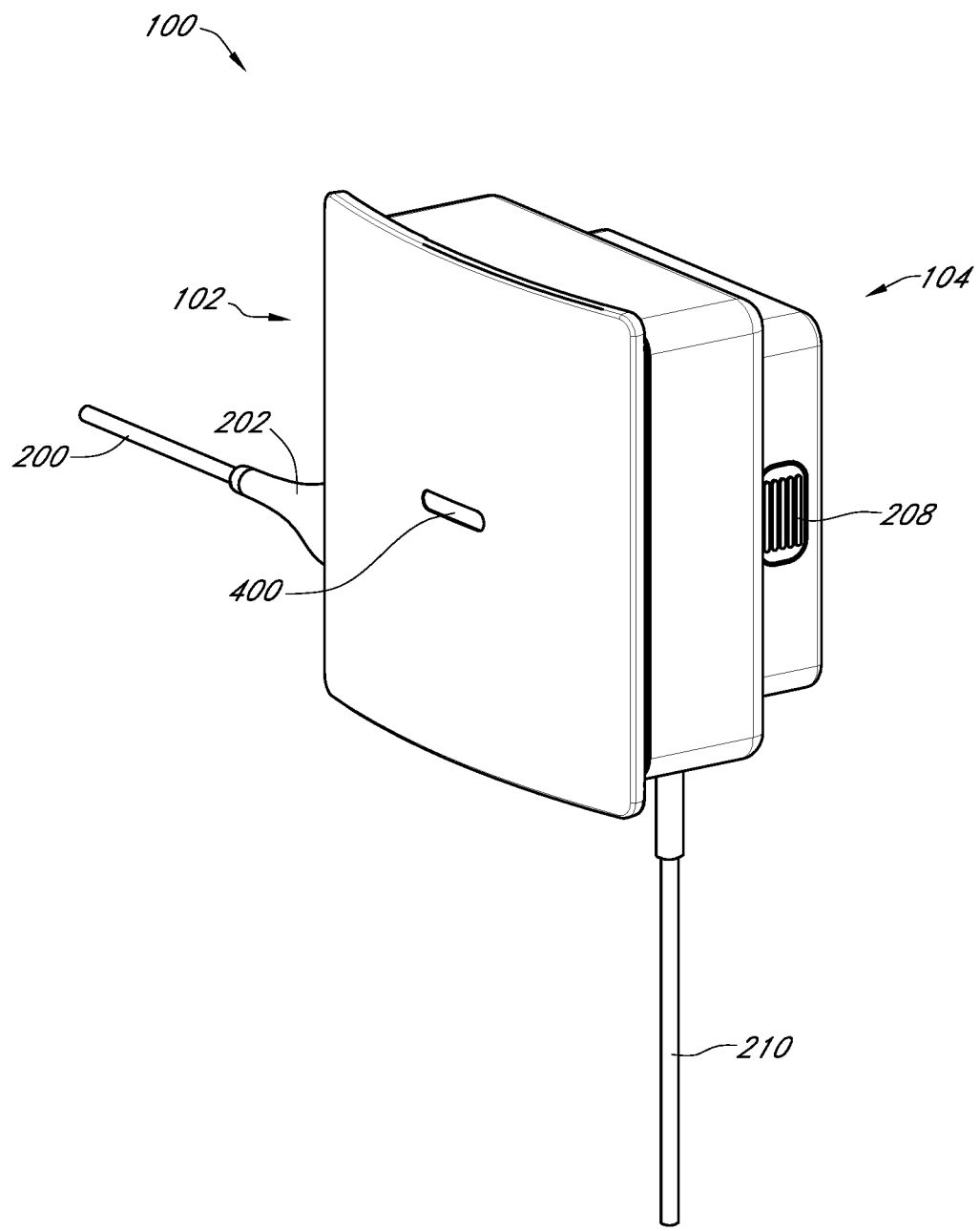

FIGS. 6A and 6B illustrate different orientations of the processing module 102 with respect to the wireless charging dock 104. As discussed above, the shapes of the inset surface 204 and the wireless charging dock 104 allow the processing module 102 to be coupled to the wireless charging dock 104 in different orientations. In an example shown in FIGS. 6A and 6B, the orientation of the processing module 102 can vary by 90 degrees. In some examples, the inset surface 204 and the mating surface 500 may be circular or hexagonal to allow the processing module 102 to be oriented in many different ways.

Figure 7A:
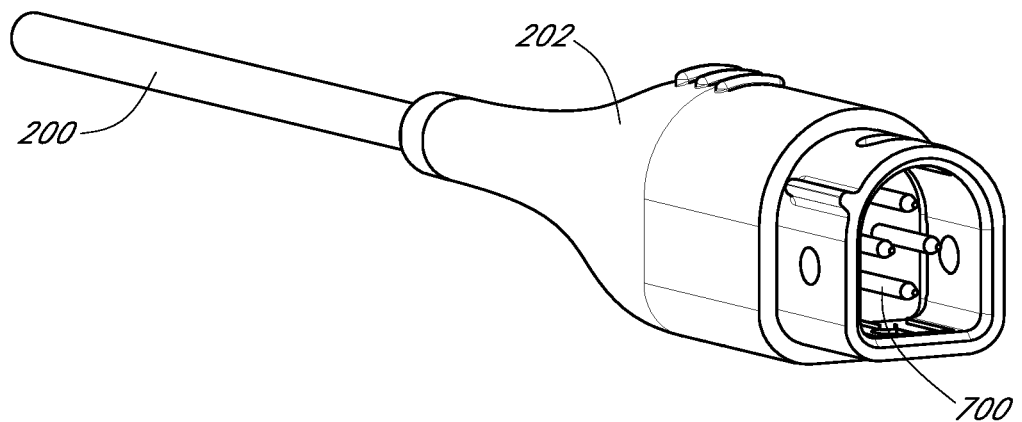
FIGS. 7A and 7B illustrate various views of a cable assembly.
Figure 7B:
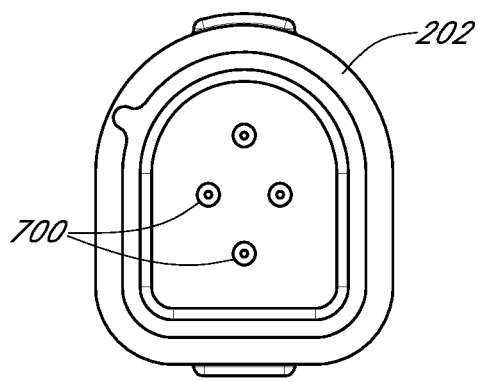

FIGS. 7A and 7B show the cable 200 and the connector 202. The cable 200 can couple to the connector 202 configured to mate with the port 300 of the processing module 102. The connector 202 and the cable 200 can be waterproof. The connector 202 can include one or more pins 700 that can removably couple with the port 300.

Figure 8A:
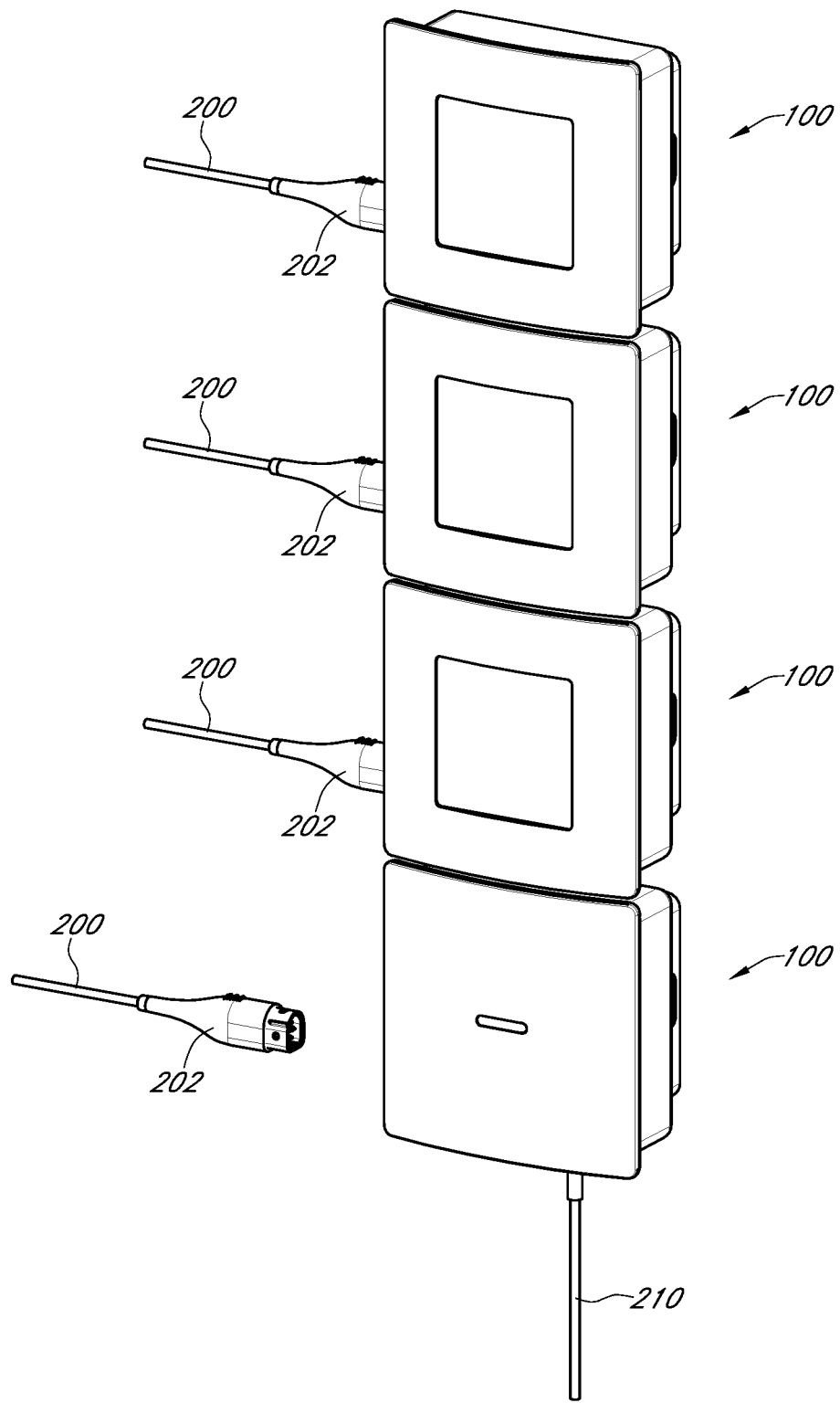
FIGS. 8A-8C illustrate various views of multiple processing modules and wireless charging docks in a chain configuration.
Figure 8B:
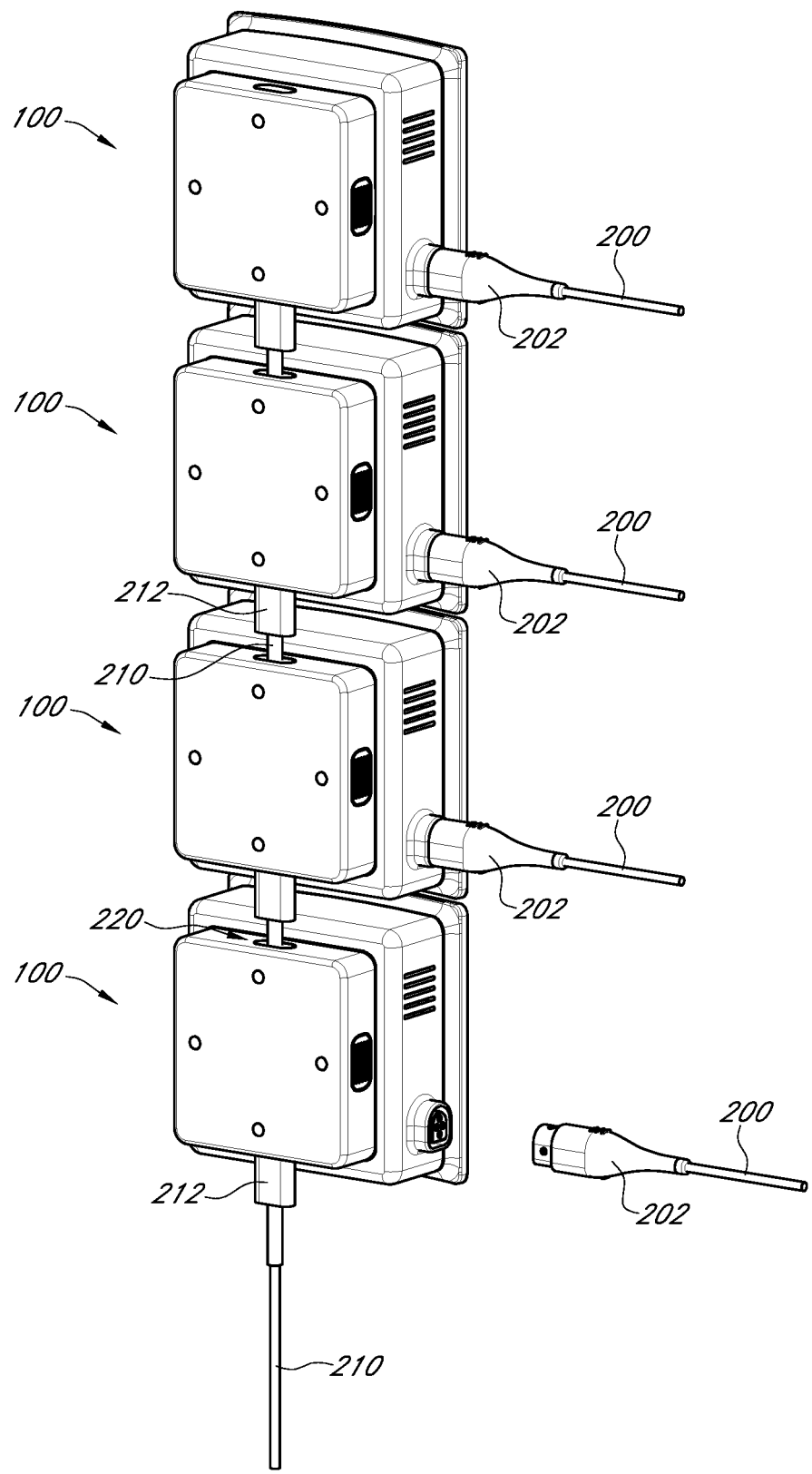
Figure 8C:
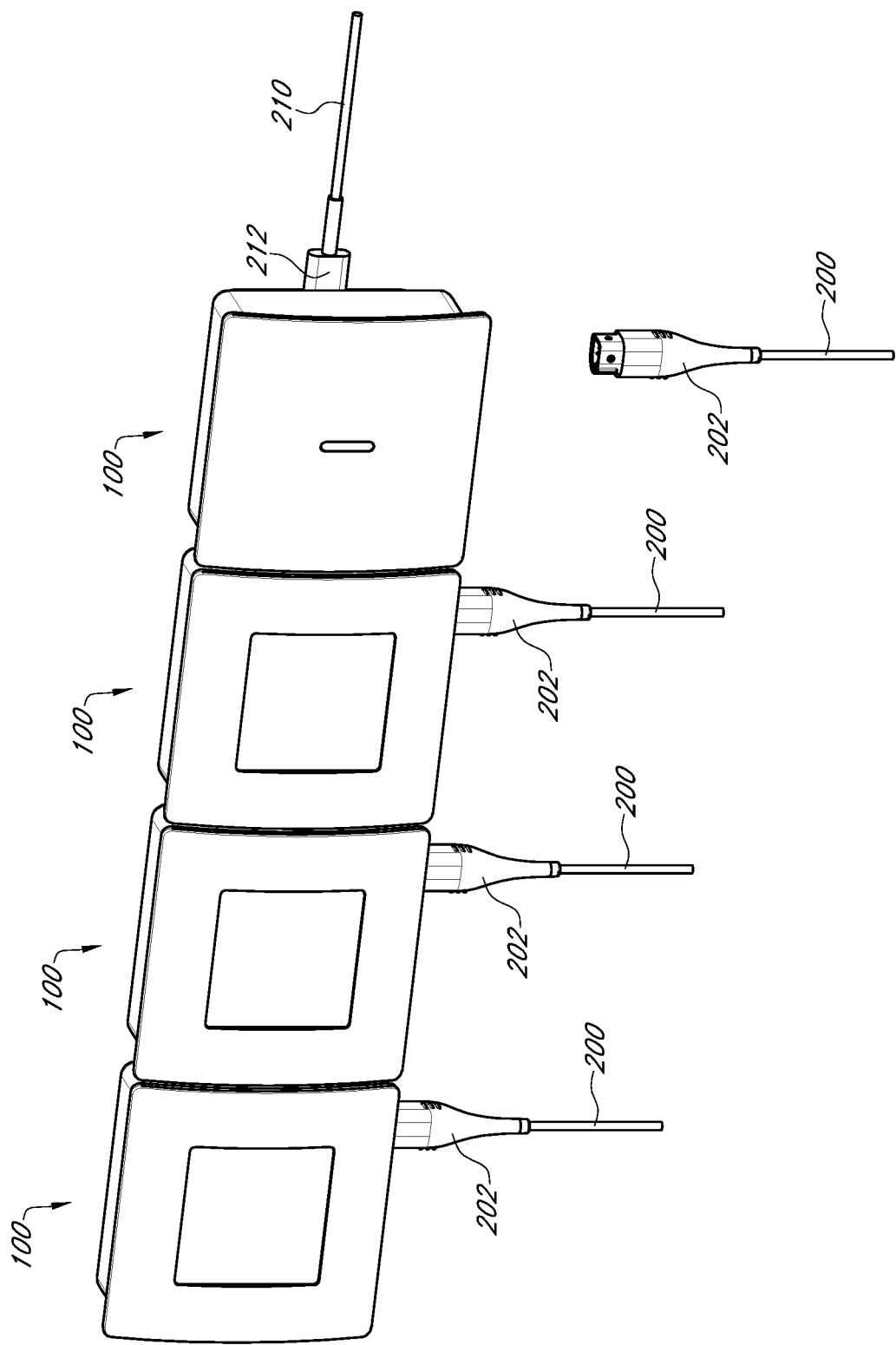

FIGS. 8A-8C illustrate sensor systems 100 connected in series in various orientations. The wireless charging docks 104 of the sensor systems 100 can be tethered via the cable 210 and the connector 212 as shown in FIG. 8B. As discussed above, the cable 210 and the connector 212 may removably couple with the covered port 220 of the wireless charging dock 104. The coupling of one or more wireless charging docks 104 via the covered ports 220, the cables 210, and the connectors 212 allow power to be transmitted between the wireless charging docks 104 of the sensor systems 100. In this regard, the one or more sensor systems 100 can receive power from a single power source or one or more power sources. The sensor systems 100 can be coupled in series expanding horizontally or vertically. In some examples, the wireless charging docks 104 can include two or more covered ports 220 to allow sensor systems 100 to couple in series expanding both horizontally and vertically.

Figure 9:
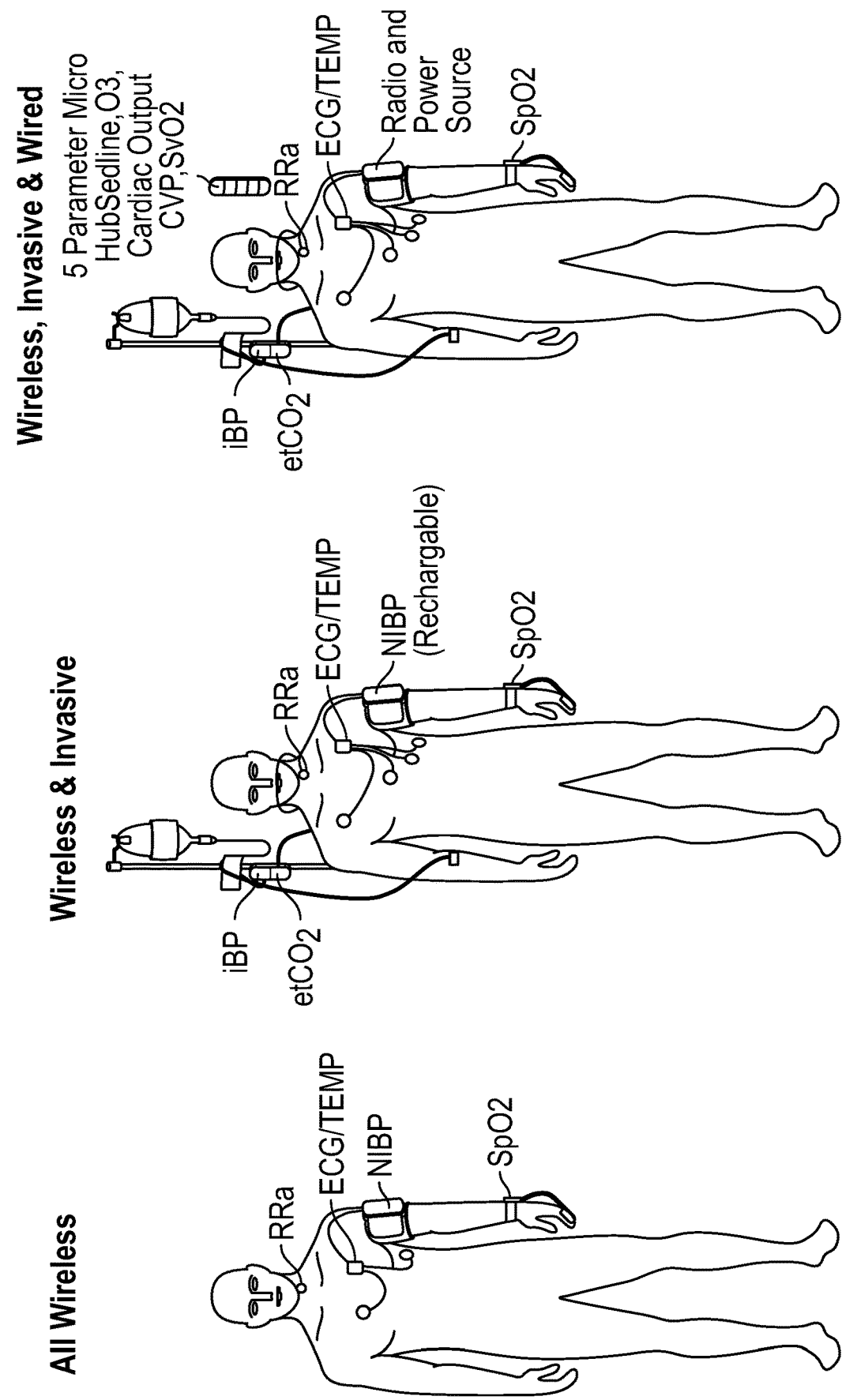
FIG. 9 illustrates various types of wired/wireless sensor assemblies coupled a patient.

FIG. 9 illustrates various illustrations of different wired and/or wireless patient sensors 106 coupled to a patient. One or more patient sensors 106 can communicate with the processing module 102 via the cable 200 and the connector 202. Additionally or alternatively, the patient sensors 106 can wirelessly transmit patient physiological data to the processing module 102. Wireless configurations of the patient sensors 106 and the processing module 102 can greatly reduce the number of cables and thereby prevent patients from being tethered to patient monitoring devices.

Figure 10A:
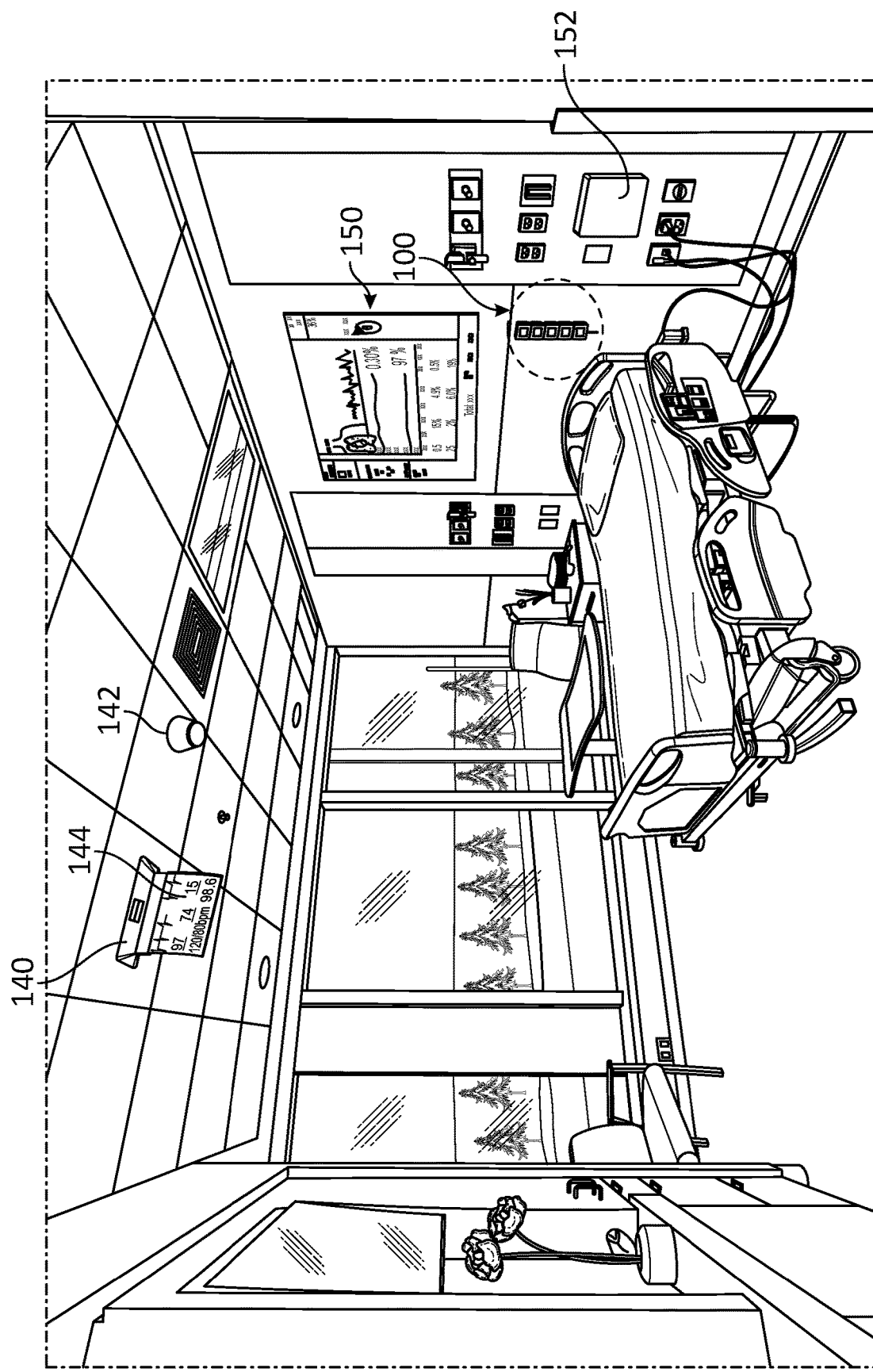
FIG. 10A illustrates another embodiment of a patient monitoring system.

FIG. 10A illustrates an example of the sensor system 100 incorporated with an alarm system 140 including a display 144. The display 144 can be a display extending downwards from the alarm system 140. The display 144 can be a clear OLED display coupled to the alarm system 140. The display 144 can display different types of health parameters including, but not limited to, peripheral capillary oxygen saturation, blood pressure, temperature, heart rate, respiration rate, and the like. The display 144 can display different types of health parameters in different ways. For example, parameters such as heart rate and blood pressure can be displayed numerically while trends of blood pressure or heart rate may be displayed as a graphical chart. Certain types of notifications (for example, a notification indicating that a patient is suffering a heart attack) may be displayed alphanumerically.

The display 144 can incorporate different color schemes for different types of health parameters or health parameter values. For example, the color red may be used to indicate health parameter values that are out of a predetermined range, while the color green may be used to indicate health parameter values that are within the predetermined range. In another example, different physiological parameters can be assigned different colors. For example, blood pressure readings may be in green while temperatures readings may be in red.

The display 144 can use different color schemes for notifications indicating different patient conditions. For example, the display 144 may generate and display notifications and/or parameter readings in red during emergency situations. On the other hand, the display 144 may generate and display notifications and/or parameter readings in green or no color in normal situations. When the color of the display 144 changes, the colors of the health parameter readings and/or notifications on the display 144 may change accordingly to ensure the parameter readings and/or notifications are visible. Additionally or alternatively, as shown in FIG. 10A, the edges of the display 144 may light up in different colors in different situations. The display 144 can also use any color of light, blinking, solid, fading effects with any of the above.

Figure 10B:
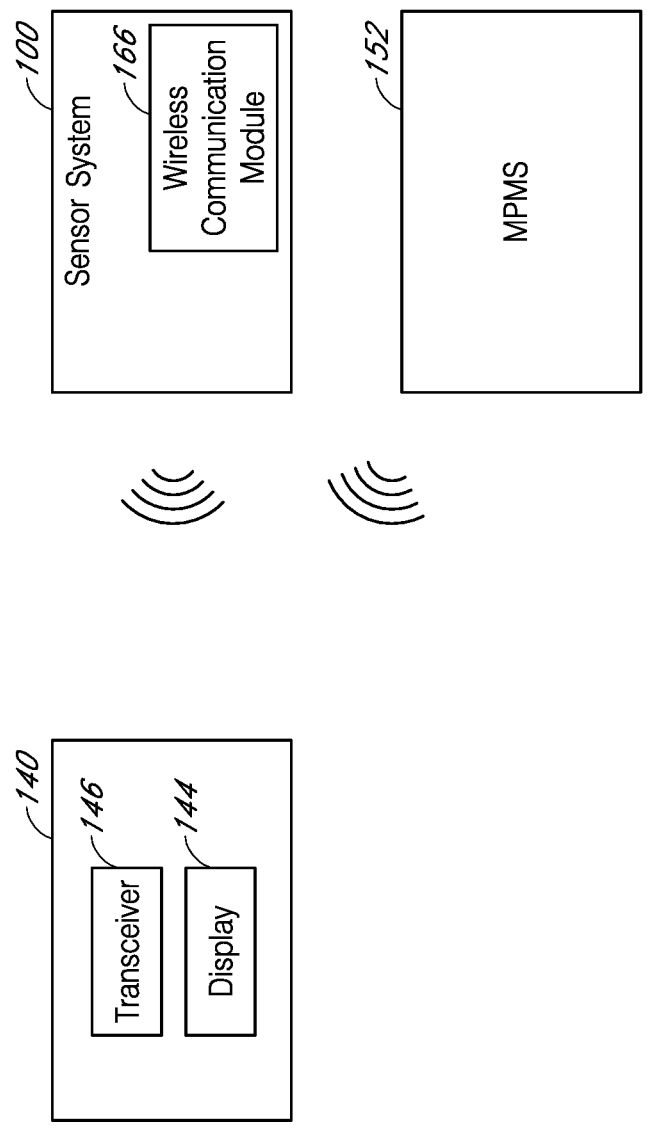
FIG. 10B illustrates a schematic diagram of an alarm system of the patient monitoring system of FIG. 10A.

The alarm system 140 can include a transceiver 146 to receive patient health data. As shown in FIG. 10B, the alarm system 140 can receive patient health data, via the transceiver 146, from the MPMS 152 or the sensor system 100. Additionally or alternatively, the alarm system 140 may receive patient health data from a network or a server connected to the MPMS 152 and/or the sensor system 100. The transceiver 146 can establish communication links via different types of communication protocols including, but not limited to, Bluetooth®, Wi-Fi, ZigBee, Z-Wave, or BLE.

The alarm system 140 may receive and display a limited portion of patient health data collected by the sensor system 100 and/or the MPMS 152. Receiving all of patient health data collected by either the sensor system 100 or the MPMS 152 may not be necessary in some circumstances. For example, a care provider may be interested in monitoring a patient's heart rate and blood pressure but not in body temperature. In such example, it may not be necessary that the alarm system 140 receives information associated with the patient's body temperature. The care provider can configure the alarm system 140 to receive any type of information to be displayed by the display 144. Additionally or alternatively, care providers can program the MPMS 152 and/or the sensor system 100 to transmit only certain types of information (for example, blood pressure, heart rate, and/or blood oxygen saturation) to the display 144. Additionally or alternatively, care providers can program the display 144 to display only physiological information that has an alarm condition. The MPMS 152, the sensor system 100, the alarm system 140, and/or the display 144 may be programmed (or configured) remotely.

The display 144 can also be integrated with other devices. For example, the display 144 may be integrated with the camera 142. Additionally or alternatively, the display 144 may be integrated with a door to a patient's room and may turn on when an attending physician or nurse walks proximate to the door. The display 150 can also be replaced entirely with a clear OLED display.

Figure 11A:
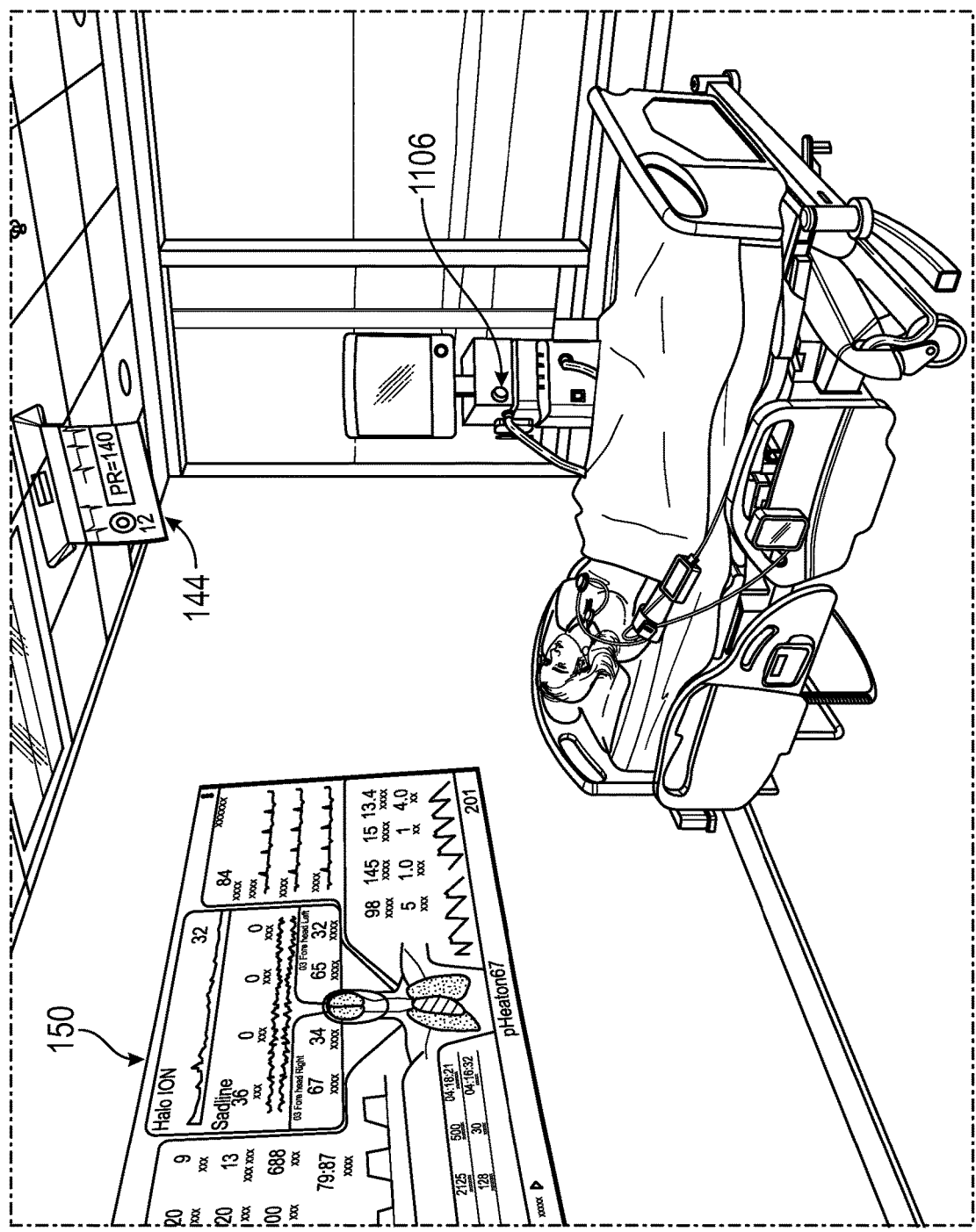
FIG. 11A illustrates another embodiment of a patient monitoring system.

FIG. 11A illustrates an example of the sensor system 100 incorporated with a connectivity notification system 1100. In the field of medical devices, sensors and monitoring devices (for example, the display 150 or the MPMS 152 as described herein) are often wirelessly connected (that is, able to transmit data to or receive data from the server) to a central server that can gather, analyze, or display data associated with various patient health parameters. This allows care providers to collect and analyze not only data points at a point in time but also an overall trend or changes in health parameters. However, when the connection between the server and sensors or other patient monitoring devices is interrupted, patient data or trends of patient data may be lost during the interruption. Therefore, it is advantageous to provide a system that allows care providers to quickly check whether sensors or other patient monitoring devices are connected to the server.

The connectivity notification system 1100 can advantageously display notifications associated with different connectivity statuses of sensors or other patient monitoring devices (for example, the display 150 or the MPMS 152). The connectivity notification system 1100 can include a connectivity beacon 1106 that can be placed at different locations to allow care providers to easily monitor and check connectivity status of sensors or other patient monitoring devices. For example, the connectivity beacon 1106 can be placed on a sensor or other patient monitoring devices that the connectivity beacon 1106 is associated with. In this regard, care providers can easily determine whether a patient monitoring device (for example, the MPMS 152) is connected to a central server by simply monitoring the connectivity beacon 1106.

Figure 11B:
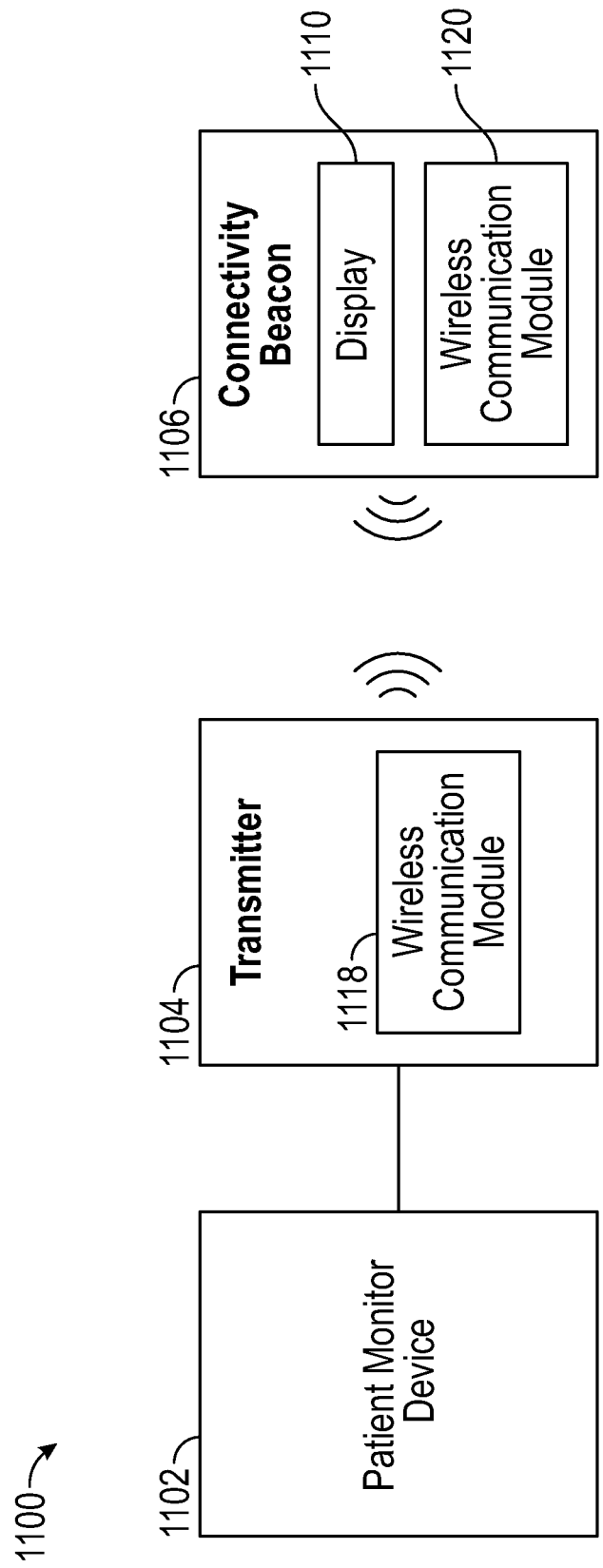
FIG. 11B illustrates a schematic diagram of a connectivity notification system of the patient monitoring system of FIG. 11A.

FIG. 11B illustrates an example schematic diagram of the connectivity notification system 1100. The connectivity notification system 1100 can include a patient monitoring device 1102, a transmitter 1104, and the connectivity beacon 1106. The patient monitoring device 1102 may be the display 150 or the MPMS 152. Alternatively, the patient monitoring device 1102 may be a sensor attached to a patient or any other device used to monitor the patient.

The transmitter 1104 can be physically coupled (for example, via a cable) to the patient monitoring device 1102. The patient monitoring device 1102 can establish electronic communication with the transmitter 1104 to allow transmission of electrical signals between the patient monitoring device 1102 and the transmitter 1104. The electrical signals transmitted between the patient monitoring device 1102 and the transmitter 1104 may include, but not limited to, signals to provide power for the transmitter 1104, connectivity signals associated with different connectivity statuses of the patient monitoring device 1102, display signals associated with different types of displays or notifications to be generated by the connectivity beacon 1106, and the like. Alternatively, the transmitter 1104 can be wirelessly coupled to the patient monitoring device 1102.

The transmitter 1104 can include a communication module 1118 that can establish a wireless communication with a communication module 1120 of the connectivity beacon 1106. The wireless communication between the communication module 1118 and the communication module 1120 may be established via different types of wireless communication protocols including, but not limited to, Near-Field Communication (NFC), Bluetooth®, Wi-Fi, ZigBee, Z-Wave, BLE, and the like.

The connectivity beacon 1106 can include the communication module 1120 and a display 1110. The connectivity beacon 1106 can receive from the transmitter 1104, via the communication module 1120 and the communication module 1118, electronic signals associated with connectivity statuses and corresponding display signals for generating different displays or notifications. The display 1110 can generate different displays or notifications based on the display signals transmitted by the transmitter 1104. The display 1110 may be a light of one or more different colors. Alternatively, the display 1110 may be a screen that can display alphanumeric or graphical displays. Additionally, the display 1110 can use a combination of color and alphanumeric or graphical displays to display different connectivity statuses.

The connectivity beacon 1106 can be associated with the transmitter 1104 such that the connectivity sensor 1106 can receive connectivity signals associated with connectivity status of a device coupled with the transmitter 1104. Additionally, the connectivity beacon 1106 may be associated with multiple transmitters 1104. In this regard, the connectivity beacon 1106 can be used to display connectivity status (e.g., by using different color lights) of multiple devices at the same time.

The connectivity beacon 1106 may not be associated with the transmitter 1104 prior to use. The connectivity beacon 1106 may brought within a predetermined distance from the transmitter 1104 to pair the connectivity beacon 1106 with the transmitter 1104 and vice versa. Once the connectivity beacon 1106 and the transmitter 1104 are paired with each other, they may be associated with each other. When paired, the connectivity beacon 1106 and the transmitter 1104 can transmit electronic signals between each other.

As discussed herein, different colors may be used to symbolize different connectivity statuses. For example, green light may be used to indicate that a device-in-interest (for example, the patient monitoring device 1102) is connected to a server. Yellow light may be used to indicate limited connectivity between the device-in-interest and the server. When there is a limited connectivity, rate of transmission of data between the server and the device-in-interest may be slower than usual. Red light may be used to indicate no connectivity between the device-in-interest and the server. Additionally or alternatively, alphanumeric displays can be used to display an identifier associated with the device-in-interest. The identifier may be a name or a code assigned to the device-in-interest that may uniquely or non-uniquely identify the device-in-interest.

Figure 11D:
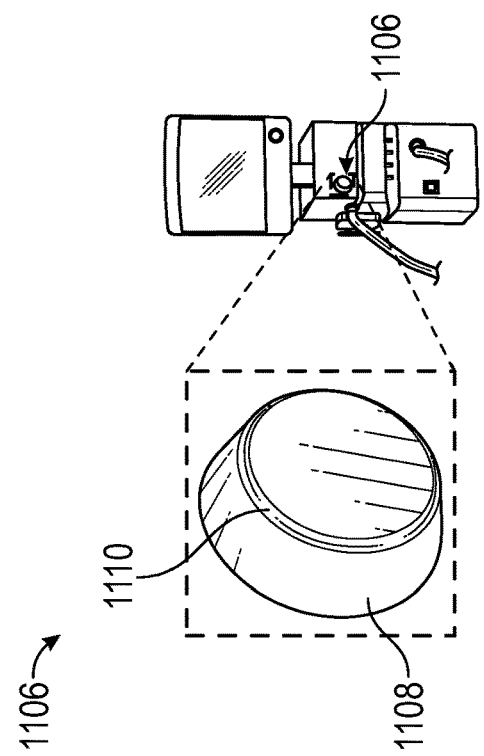
FIG. 11D illustrates an example connectivity beacon for the connectivity notification system of FIG. 11B.
Figure 11C:
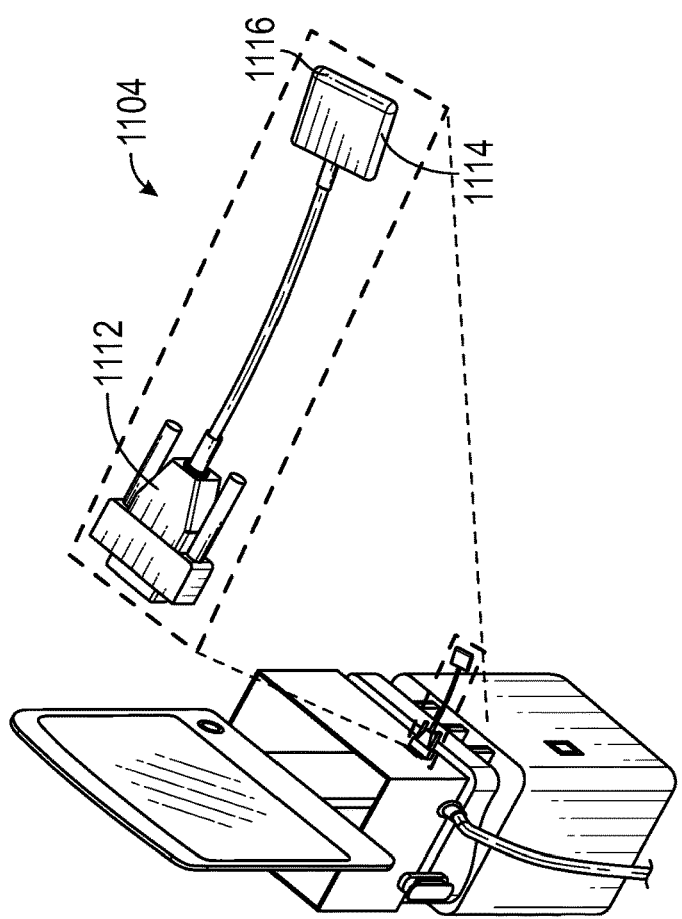
FIG. 11C illustrates an example transmitter for the connectivity notification system of FIG. 11B.

FIGS. 11C and 11D illustrate examples of the transmitter 1104 and the connectivity beacon 106. In an example shown in FIG. 11C, the transmitter 1104 can include a connector 1112, a body 1114, a display 1116, and a cable 1118. The connector 1112 can be coupled to the body 1114 via the cable 1118. The display 1116 can be a part of the body 1114 and can emit lights in different color to indicate different connectivity statuses. The display 1116 of the transmitter 1104 may use the same or different color scheme as the display 1110 of the connectivity beacon 1106. The connector 1112 can be one of the following types of connectors including, but not limited to, video graphics array (VGA) connector, high definition multimedia interface (HDMI) connector, RCA connector, USB 2.0, USB 3.0, digital visual interface (DVI) connector, and the like.

The connectivity beacon 1106 can include a body 1118 and a display 1110. The body 1118 can include a bottom portion and a top portion. The bottom portion may be placed against a device-in-interest (for example, the patient monitoring device 1102) to removably attach the connectivity beacon 1106 to the device-in-interest. Alternatively, the connectivity beacon 1106 may be attached to a wall, side of a bed, on a door, or any other location that may be easy for a care provider to spot. The display 1110 can be a part of the top portion that may face in a direction away from the bottom portion. The display 1110 may be positioned around an outer circumference of the top portion. Additionally or alternatively, the display 1110 can be positioned about a top surface of the top portion.

The displays 1116 and 1110 may be light-emitting diodes that can generate one or more different colors as discussed herein. Different colors can be turned on and off to indicate different connectivity status of the patient monitoring device 1102. Alternatively, the displays 1116 and 1110 can display different alphanumeric characters instead of or in addition to the different colored lights.

Different attachment mechanisms may be utilized to attach the connectivity beacon 1106 to a device or other locations as discussed herein. Such mechanisms may include magnets, adhesives, Velcro, and the like that may allow the connectivity beacon 1106 to be easily removed after being attached to a surface. Alternatively, the connectivity beacon 1106 may be permanently adhere to a surface.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the systems, devices or methods illustrated can be made without departing from the spirit of the disclosure. As will be recognized, certain embodiments described herein can be embodied within a form that does not provide all of the features and benefits set forth herein, as some features can be used or practiced separately from others.

The term "and/or" herein has its broadest, least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the foregoing disclosure has been described in terms of certain preferred embodiments, other embodiments will be apparent to those of ordinary skill in the art from the disclosure herein. Additionally, other combinations, omissions, substitutions, and modifications will be apparent to the skilled artisan in view of the disclosure herein. Accordingly, the present invention is not intended to be limited by the description of the preferred embodiments, but is to be defined by reference to claims.

What is claimed is:

1. A system for monitoring patient physiological parameters, the system comprising:
    a patient sensor configured to collect information associated with patient physiological conditions and generate a sensor output representative of the information;
    a processor in communication with the patient sensor and configured to receive the sensor output and determine physiological parameters based at least in part on the sensor output, the processor comprising a wireless transmitter configured to communicate the physiological parameters; and
    a notification system separate from the patient sensor and processor, the notification system mounted proximate a door or entrance to a room of the patient comprising:
        a receiver configured to receive the physiological parameters or the sensor output from the processor, and
        a display system in communication with the receiver and configured to display the received physiological parameters or the sensor output of the patient in the room, the display system comprising a sensor configured to detect when a healthcare provider walks proximate the door, the display system configured to turn on when a healthcare provider is proximate the door, wherein the display system is programmable to only display parameters with alarm conditions,
        wherein the notification system is configured to generate an auditory and visual alarm indicative of the patient in the room experiencing a life-threatening event in response to one or more of the physiological parameters exceeding a predetermined range.

2. The system of claim 1, wherein the patient sensor and the processor are in wireless communication.

3. The system of claim 1, wherein at least one edge of the display system is configured to emit light based at least in part on the received physiological parameters or the received sensor output.

4. The system of claim 1, wherein the sensor of the display system comprises a camera.

5. The system of claim 1, comprising a charging dock configured to couple to and charge the processor, wherein the charging dock is a wireless charging dock.

6. The system of claim 5, wherein the charging dock comprises a communication interface configured to allow the charging dock to couple with other wireless charging docks.

7. The system of claim 1, wherein the notification system displays a subset of the received physiological parameters or the sensor output.

8. The system of claim 1, wherein the processor generates a first status data based at least in part on a comparison of the physiological parameters and predetermined threshold values, the first status data associated with patient health condition.

9. The system of claim 5, wherein the processor comprises an inset surface dimensioned to receive the wireless charging dock.

10. The system of claim 1, further comprising:
    a network connectivity monitoring system comprising:
        an indicator configured to generate and display notifications based at least on connectivity status of the system for monitoring patient physiological parameters with a monitoring network configured to receive a signal from the system for monitoring patient physiological parameters.

11. The system of claim 10, wherein the network connectivity monitoring system comprises a transmitter, the transmitter is configured to:

receive connectivity data from the system for monitoring patient physiological parameters; and transmit the connectivity data to the indicator, wherein the connectivity data is associated with the connectivity status of the system for monitoring patient physiological parameters.

12. The system of claim 10, wherein the notifications comprise lights of one or more different colors, and wherein the one or more different colors reflect the connectivity status.

13. A device which receives and displays patient physiological parameters, the device comprising:

a receiver configured to receive physiological parameters or a sensor output from a patient monitoring device, the patient monitoring device configured to collect information associated with patient physiological conditions and generate the sensor output representative of the information;

a sensor configured to detect when a healthcare provider walks proximate an entrance to a room of the patient;

a display in communication with the receiver and configured to be mounted proximate the entrance to the room of the patient, the display configured to display the received physiological parameters or the sensor output, the display configured to turn on when a healthcare provider is proximate the entrance to the room, wherein the display is programmable to only display parameters with alarm conditions, wherein the display is configured to generate a visual alarm indicative of the patient in the room experiencing a life-threatening event in response to one or more of the physiological parameters or sensor output exceeding a predetermined range, and a speaker configured to generate an auditory alarm indicative of the patient in the room experiencing a life-threatening event in response to one or more of the physiological parameters or sensor output exceeding a predetermined range.

14. The device of claim 13, wherein the sensor output is associated with at least one or more of the following health parameters: blood pressure, blood oxygen saturation level, heart rate, body temperature, or respiratory rate.

15. The device of claim 13, wherein the sensor is a camera.

* * * * *